(12) United States Patent
Sato

(10) Patent No.: US 9,888,139 B2
(45) Date of Patent: Feb. 6, 2018

(54) NON-TRANSITORY COMPUTER-READABLE RECORDING MEDIUM STORING COMPUTER-READABLE INSTRUCTIONS FOR CAUSING PORTABLE TERMINAL TO EXECUTE COMMUNICATION PROCESSING WITH IMAGE PROCESSING DEVICE, PORTABLE TERMINAL, AND COMMUNICATION SYSTEM

(71) Applicant: BROTHER KOGYO KABUSHIKI KAISHA, Nagoya, Aichi (JP)

(72) Inventor: Hirokazu Sato, Nagoya (JP)

(73) Assignee: BROTHER KOGYO KABUSHIKI KAISHA, Nagoya, Aichi ( * ) Notice: Subject to any disclaimer, the term of this patent is extended or adjusted under 35 U.S.C. 154(b) by 0 days.

(21) Appl. No.: 15/175,142

(22) Filed: Jun. 7, 2016

(65) Prior Publication Data

US 2017/0094081 A1    Mar. 30, 2017

(30) Foreign Application Priority Data

Sep. 28, 2015    (JP) ................... 2015-190298

(51) Int. Cl.
*H04N 1/00* (2006.01)
*G06F 3/041* (2006.01)
*H04N 1/327* (2006.01)

(52) U.S. Cl.
CPC ......... *H04N 1/00392* (2013.01); *G06F 3/041* (2013.01); *H04N 1/0044* (2013.01); *H04N 1/00307* (2013.01); *H04N 1/00411* (2013.01); *H04N 1/00474* (2013.01); *H04N 1/00973* (2013.01); *H04N 1/32767* (2013.01);

(Continued)

(58) Field of Classification Search
USPC ........................................ 358/1.15
See application file for complete search history.

(56) References Cited

U.S. PATENT DOCUMENTS

2006/0044601 A1* 3/2006 Misawa ................. G06F 3/122
                                                     358/1.15
2014/0376045 A1* 12/2014 Oyoshi .............. H04N 1/32128
                                                     358/1.15
2015/0029550 A1    1/2015 Asai

FOREIGN PATENT DOCUMENTS

JP    2004-236031 A    8/2004
JP    2006-211472 A    8/2006
JP    2015-023553 A    2/2015

* cited by examiner

*Primary Examiner* — Ngon Nguyen
(74) *Attorney, Agent, or Firm* — Scully, Scott, Murphy & Presser, P.C.

(57) ABSTRACT

A portable terminal may display a first screen for receiving a first inputting operation and a second inputting operation on a display. The portable terminal may transmit first scan instruction information to the image processing device. The portable terminal may receive the first scan image data generated by the scan process from the image processing device. The portable terminal may generating first FAX image setting information that reflects the scan image setting information. The portable terminal may display, on the display, a second screen including a first setting image indicating the first FAX image setting information and a preview image of the first scan image data. The portable terminal may generate first FAX image data. The portable terminal may transmit first FAX instruction information and the first FAX image data to the image processing device.

10 Claims, 12 Drawing Sheets

(52) U.S. Cl.
CPC ............... *H04N 2201/0093* (2013.01); *H04N 2201/0094* (2013.01)

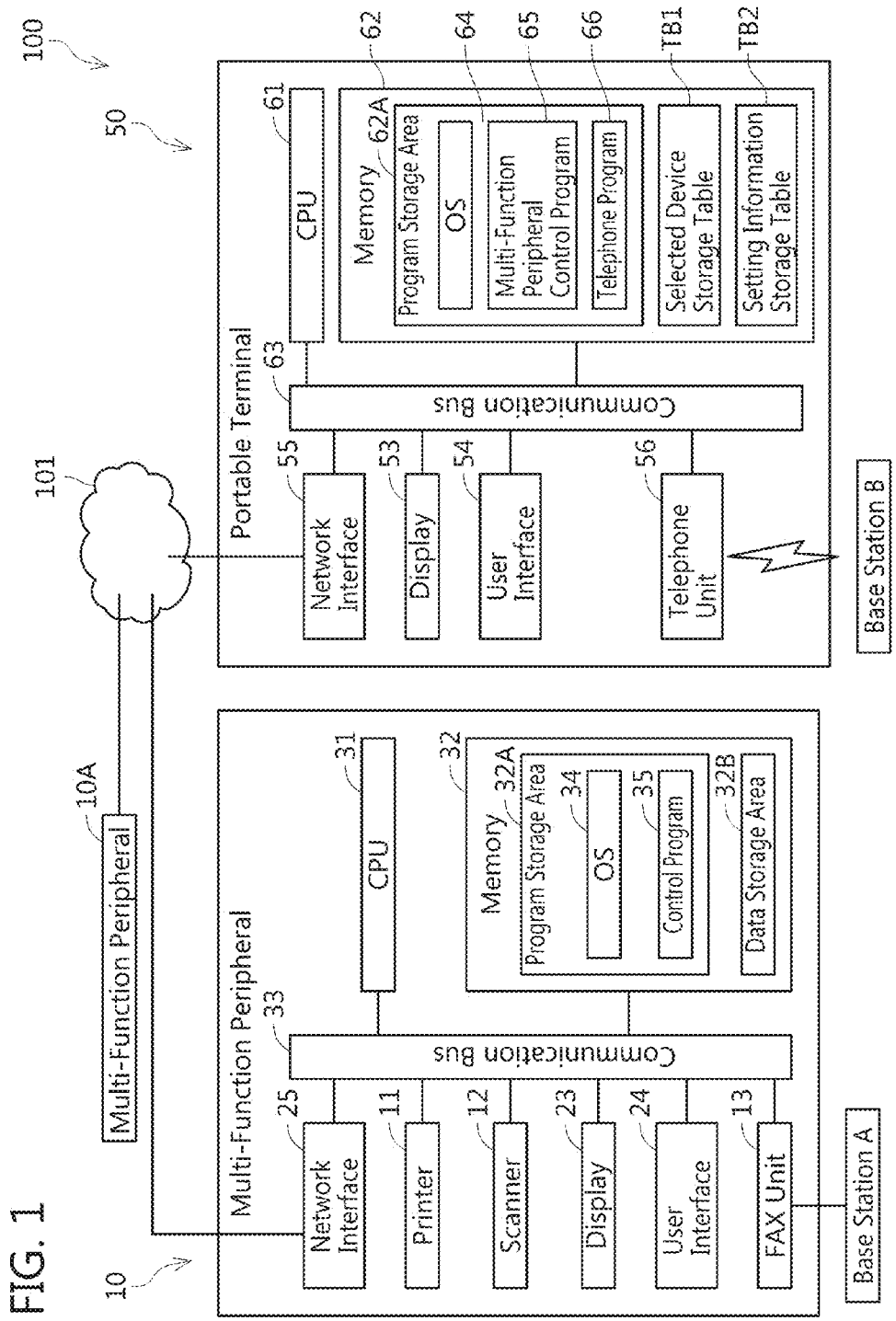

FIG. 15

| Selected Device Information | IP Address | Model Name | FAX Transmittable Size |
|---|---|---|---|
| | ×××.×××.×××.××× | MFP-123 | Monochrome: A3, A4, Letter<br>Color: A4, Letter |

| | | Document Size Information | Color Information |
|---|---|---|---|
| Scan-to-FAX Process | Default FAX Image Setting Information | A4 | Monochrome |
| | First Default Scan Image Setting Information | A3 | Color |
| Scan Process | Second Default Scan Image Setting Information | Letter | Monochrome |

| | | Document Size Information | Color Information |
|---|---|---|---|
| 231 | First FAX Image Setting Information | Letter | Color |
| 232 | Second FAX Image Setting Information | A4 | Monochrome |
| 233 | Third FAX Image Setting Information | B5 | Color |

321 322

NON-TRANSITORY COMPUTER-READABLE RECORDING MEDIUM STORING COMPUTER-READABLE INSTRUCTIONS FOR CAUSING PORTABLE TERMINAL TO EXECUTE COMMUNICATION PROCESSING WITH IMAGE PROCESSING DEVICE, PORTABLE TERMINAL, AND COMMUNICATION SYSTEM

CROSS-REFERENCE TO RELATED APPLICATION

This application claims priority to Japanese Patent Application No. 2015-190298, filed on Sep. 28, 2015, the contents of which are hereby incorporated by reference into the present application.

TECHNICAL FIELD

The technique described in this description relates to a program that causes a facsimile (FAX) device to transmit image data by facsimile, and a portable terminal that executes this program.

DESCRIPTION OF RELATED ART

A program that can be installed in a portable terminal, and that causes an image processing device connected to the portable terminal to perform FAX transmission has long been known.

SUMMARY

In the aforementioned program, for example, processes as below may be executed: generation of scan image data by causing the image processing device to execute a scan process; and then a FAX transmission process for transmitting the generated scan data by facsimile by causing the image processing device to execute the FAX transmission process. In executing these processes, a scan image setting to indicate various settings for the image to be generated in the scan process and a FAX image setting to indicate various settings for a FAX image data to be transmitted in the FAX transmission process may be necessary in some cases. However, it is not preferable to have a user perform both of the settings for the scan image setting and the FAX image setting due to a large burden on the user.

One technique disclosed in the present application is a non-transitory computer-readable recording medium storing computer-readable instructions for a portable terminal. The portable terminal may comprise a display and a network interface. The display may comprise a touch panel. The computer-readable instructions, when executed by a processor of the portable terminal, may cause the portable terminal to perform displaying a first screen on the display. The first screen may be a screen for receiving a first inputting operation and a second inputting operation via the touch panel. The first inputting operation may be an operation of designating scan image setting information that is setting information on various setting parameters for scan image data to be generated in a scan process, which is a process to be executed in an image processing device. The computer-readable instructions may cause the portable terminal to perform transmitting first scan instruction information to the image processing device via the network interface in response to receiving the second inputting operation. The first scan instruction information may be information for instructing the image processing device to generate first scan image data by the scan process using the scan image setting information, which was designated by the first inputting operation. The computer-readable instructions may cause the portable terminal to perform receiving the first scan image data generated by the scan process from the image processing device via the network interface. The computer-readable instructions may cause the portable terminal to perform generating first FAX image setting information that reflects the scan image setting information that was designated by the first inputting operation. The first FAX image setting information may be setting information of various setting parameters of FAX image data to be transmitted in a FAX transmission process, which is a process executed in the image processing device. The computer-readable instructions may cause the portable terminal to perform displaying a second screen on the display in response to the generation of the first FAX image setting information. The second screen may be a screen including a first setting image indicating the first FAX image setting information that was generated, and a preview image of the first scan image data. The second screen may be also a screen for receiving a third inputting operation and a fourth inputting operation via the touch panel. The third inputting operation may be an operation to designate address information indicating a transmission destination for the FAX transmission process. The computer-readable instructions may cause the portable terminal to perform generating first FAX image data. The first FAX image data may be the FAX image data generated from the first scan image data by using the first FAX image setting information. The computer-readable instructions may cause the portable terminal to perform transmitting first FAX instruction information and the first FAX image data to the image processing device via the network interface in response to receiving the fourth inputting operation. The first FAX instruction information may be information for instructing the image processing device to execute the FAX transmission process in order to transmit the first FAX image data to the transmission destination indicated by the address information.

BRIEF DESCRIPTION OF THE DRAWINGS

FIG. 1 is a block diagram of a FAX system 100.

FIG. 15 is an example of a selected device storage table TB1;

FIG. 16 is an example of a setting information storage table TB2; and

FIG. 17 is an example of first to third FAX image setting information.

EMBODIMENT

Figure 2A:
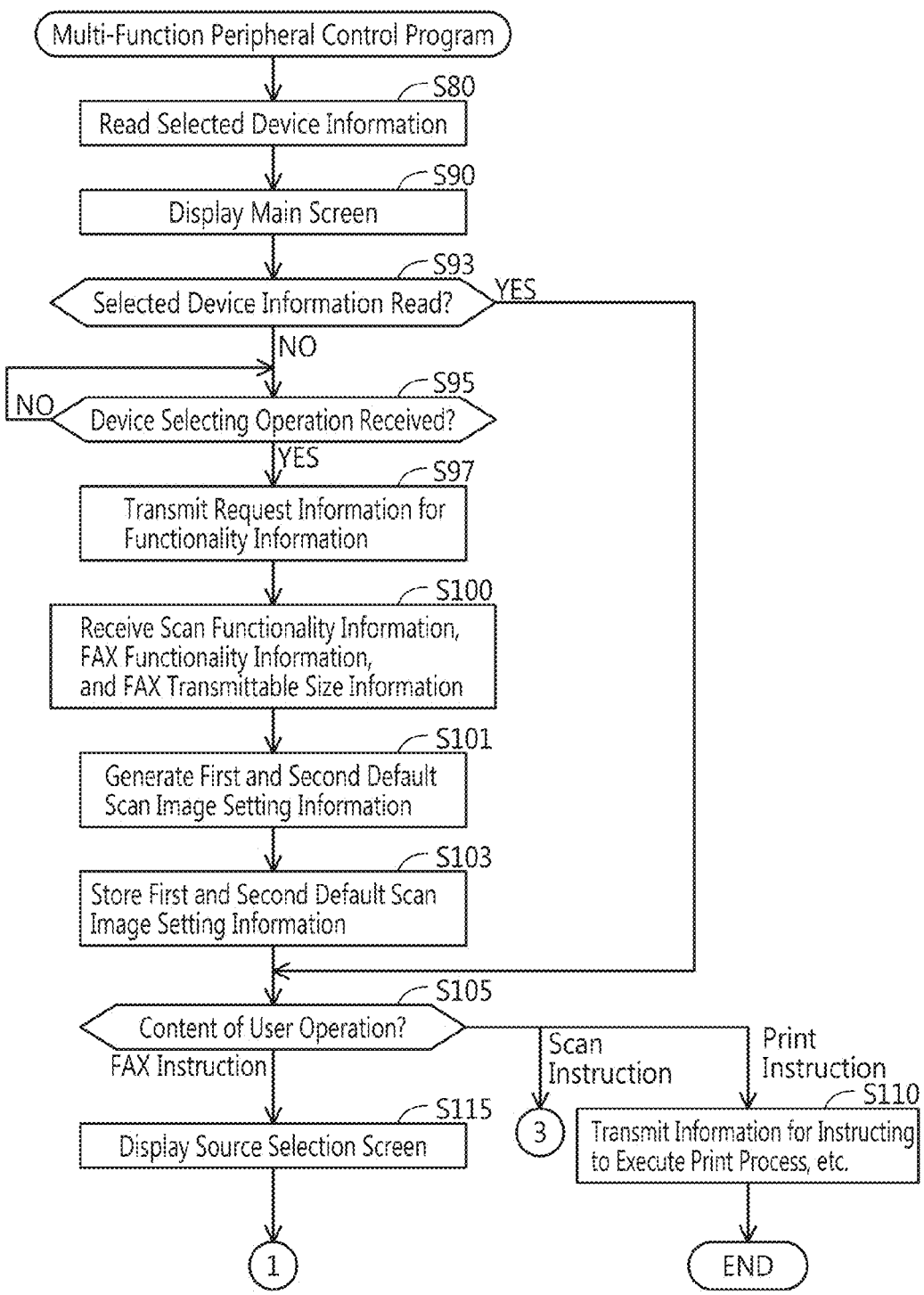
FIG. 2A is a flowchart of a process executed by a multi-function peripheral control program 65.
Figure 2B:
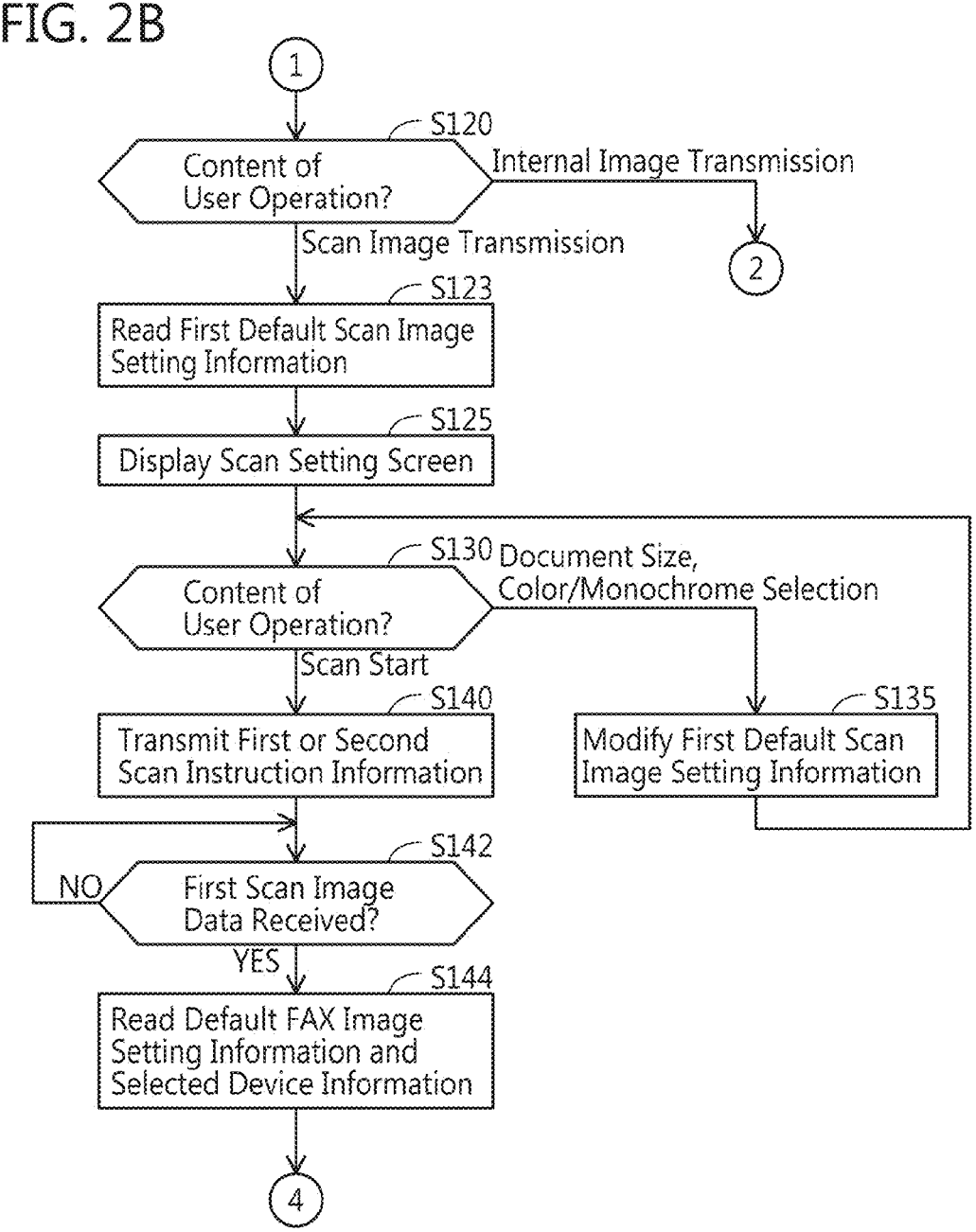
FIG. 2B is a flowchart of a process executed by the multi-function peripheral control program 65.
Figure 3:
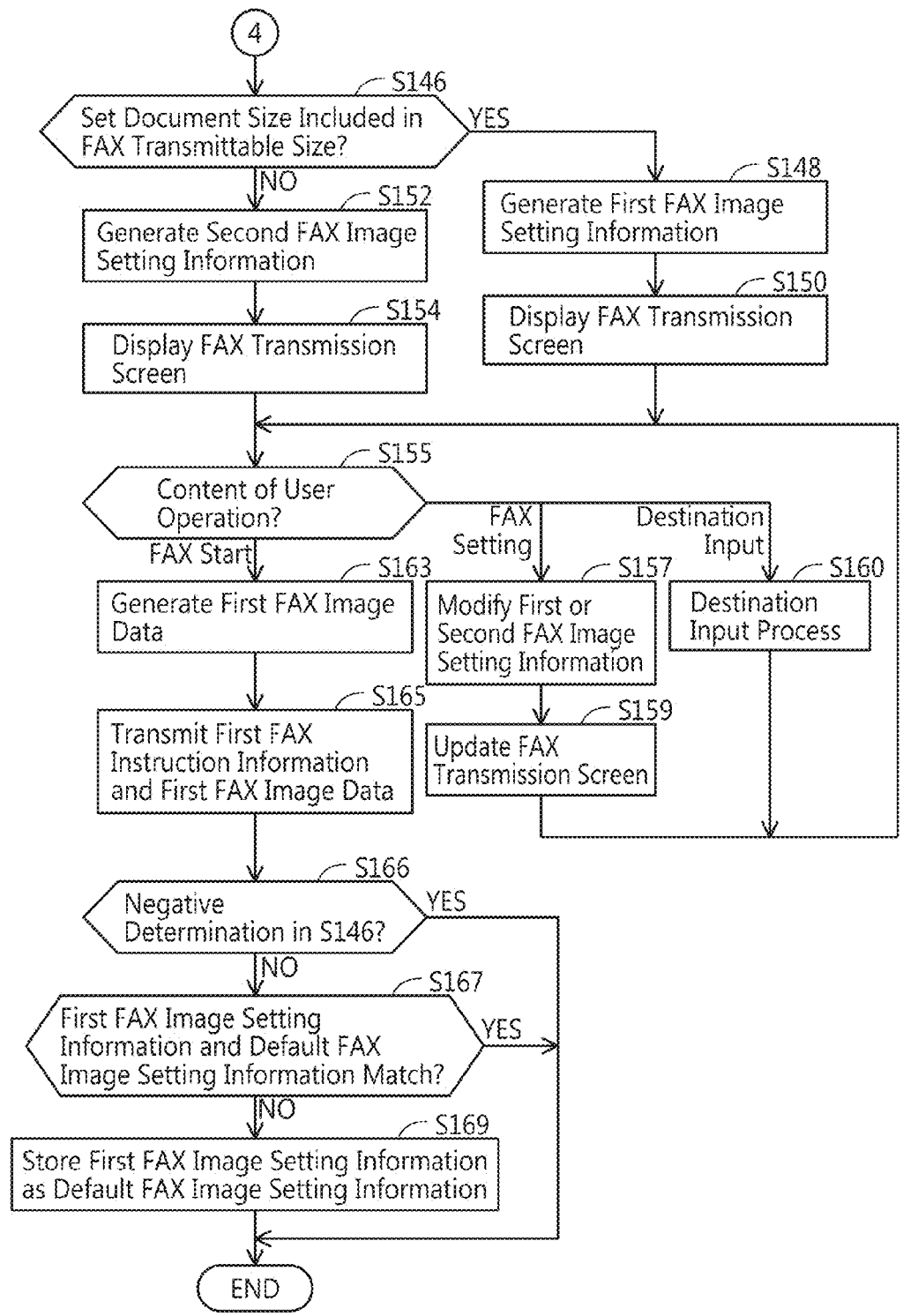
FIG. 3 is a flowchart of a process executed by the multi-function peripheral control program 65.
Figure 4:
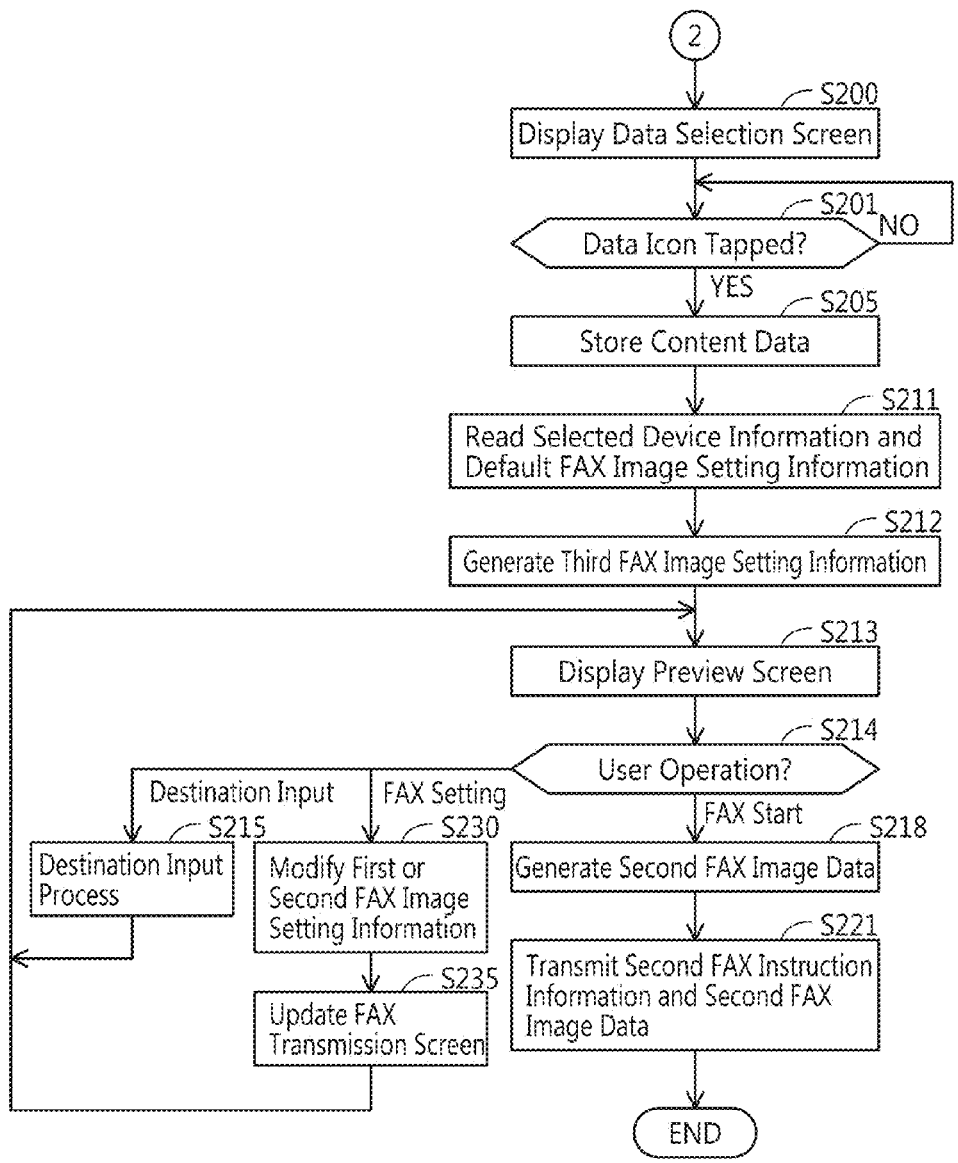
FIG. 4 is a flowchart of a process executed by the multi-function peripheral control program 65.

Hereinafter, embodiments of this disclosure will be described with reference to appropriate drawings. Also, it goes without saying that the embodiments to be described below are just examples of this disclosure, and the embodiments of this disclosure can be appropriately modified without changing the scope of this disclosure.

FIG. 1 is a view schematically illustrating a FAX system 100 according to the present embodiment. The FAX system 100 shown in FIG. 1 is composed of multi-function peripherals (referred to as MFPs) 10 and 10A and a portable terminal 50. The MFPs 10 and 10A and the portable terminal 50 can communicate with each other. The MFPs 10 and 10A and the portable terminal 50 are electrically connected. The MFP 10 and the portable terminal 50 may be connected via a communication network 101 such as a wired LAN or a wireless LAN, or may be connected by USB cables or the like.

As shown in FIG. 1, the MFP 10 mainly includes a printer 11, a scanner 12, a FAX unit 13, a display 23, a user interface 24, a network interface 25, a CPU 31, a memory 32, and a communication bus 33. Individual components constituting the MFP 10 are connected to one another via the communication bus 33. The MFP 10 is an example of a FAX device. Notably, the FAX device of the present embodiment is not particularly limited to the MFP 10, but may be a simple facsimile device that does not include any printer 11 or scanner 12.

The printer 11 performs a printing operation of images represented by image data on print sheets. The printer 11 performs a printing operation using a known printing scheme such as an inkjet scheme or an electrophotographic. The scanner 12 performs a scanning operation of reading an image recorded on a document and generating the image data.

The FAX unit 13 performs a FAX transmitting operation and a FAX receiving operation of transmitting or receiving contents data in a scheme based on a FAX protocol. The FAX unit 13 performs the FAX transmission of the content data to an external device through a base station A connected by a wired phone line, for example. The FAX unit 13 performs the FAX transmission of the FAX image data to the external device using a telephone number selected through the user interface 24 from among telephone numbers of which inputs have been received through the user interface 24 or telephone numbers stored in a data storage area 32B.

The display 23 has a display screen for displaying a variety of information. An LCD, an OELD, or the like can be used as the display 23.

The user interface 24 receives user's operations for selecting objects displayed on the display screen of the display 23. Specifically, the user interface 24 has buttons, and outputs various operation signals associated with pushed buttons, to the CPU 31. Also, the user interface 24 may have a membranous touch sensor superimposed on the display screen of the display 23. That is, the display 23 may be configured as a touch panel display.

Notably, the term "object" means an image which the user can select by operating the user interface 24. As an example, objects may be character strings displayed on the display 23, and when the user pushes a direction key of the user interface 24, one of the objects may be highlighted, and the highlighted object may be selected when the user pushes an OK button of the user interface 24 to confirm the selection. As another example, in a case where the user interface 24 is a touch panel, the objects may be icons, buttons, links, and the like displayed on the display 23, and an object displayed at a touched position may be selected.

The user interface 24 implemented as a touch panel receives user's operations touching the display screen of the display 23. Also, the user interface 24 outputs position information representing the touched position on the display screen. For example, the position information can be expressed as coordinates (x, y) on an x-y plane with the upper left end of the display screen denoted as the origin, and the right direction denoted as the positive direction of the x axis, and the downward direction denoted as the positive direction of the y axis. A touch panel sensor may employ a known scheme such as an electrostatic capacitance scheme or a resistive film scheme.

Incidentally, in this specification, the term "touch" includes every operation of bringing an inputting medium into contact with the display screen. That is, touch examples may be a tap operation of detaching the inputting medium currently in touch with the display screen therefrom in a predetermined time, a long touch operation of holding the inputting medium currently in touch with the display screen to stay still, a slide operation of sliding the inputting medium currently in touch with the display screen, a flick operation of flicking the inputting medium currently in touch with the display screen with acceleration equal to or higher than a threshold value, a pinch-in operation of sliding two inputting media touching different locations on the display screen toward each other, a pinch-out operation of sliding the two inputting media touching different locations on the display screen away from each other, and the like.

Also, the term "touch" may include not only a case where an inputting medium is brought into contact with the display screen but also a case where an inputting medium is brought to a position close to the display screen. Further, the inputting media may be user's fingers, touch pens, etc. Hereinafter, an operation of tapping a position of an icon displayed on the display 53 will be described as an example of a user operation of selecting the corresponding icon.

The network interface 25 is an interface for performing communication with external devices via the communication network 101. That is, the MFP 10 outputs a variety of information to the portable terminal 50 via the network interface 25, and receives a variety of data or a variety of information from the portable terminal 50 via the network interface 25. A specific communication procedure of the network interface 25 is not limited. For example, Wi-Fi (a trademark of the Wi-Fi Alliance) can be used. Also, the MFP 10 may have an installation interface such as a USB cable, instead of the network interface 25.

The CPU 31 controls the operation of the whole MFP 10. On the basis of a variety of information which is output from the user interface 24, a variety of information acquired from external devices via the network interface 25, and the like, the CPU 31 acquires various programs (to be described below) from the memory 32 and executes those programs.

The memory 32 has a program storage area 32A and a data storage area 32B. The program storage area 32A stores an OS 34 and a control program 35. Also, the program described in this specification may be a single program, or may be an aggregate of a plurality of programs. The data storage area 32B stores data or information necessary for executing the control program 35.

Also, in this specification, the term "data" and the term "information" represent a bit or a bit string which can be handled by a computer. That is, the two terms are in common in that view. However, when the computer handles "data," it is unnecessary for the computer to recognize the meanings of individual bits. In contrast, when the computer handles "information," an operation of the computer is diverged according to the meanings of individual bits. Also, a term "instruction" represents a control signal for prompting a device being a transmission destination to perform a subsequent operation. An instruction may include "information" or the instruction itself may have characteristics as "information".

Further, even when "data" or "information" is changed in its format (for example, a text format, a binary format, a flag format, and so on) for each computer, as long as it can be recognized that the meaning of the changed data or information is identical to the meaning of the original data or information, the changed data or information is handled as data or information identical to the original data or information. For example, information indicating "two" may be saved in one computer as an ASCII code "0x32" which is text format information, and may be saved in another computer as a binary number "10" which is binary format information.

However, the term "data" and the term "information" are not strictly distinguished and are permitted to be exceptionally handled. For example, data may be temporarily handled as information, and information may be temporarily handled as data. Further, what is handled as being data in one device may be handled as information in another device. Furthermore, information may be taken out from among data, or data may be taken out from among information.

The memory 32 may be configured, for example, by a RAM, a ROM, an EEPROM, an HDD, a buffer included in the CPU 31, or any combination thereof.

Also, the memory 32 may be a computer-readable storage medium. The computer-readable storage medium is a non-transitory medium. Examples of the non-transitory medium include not only the above described examples but also other recording media such as a CD-ROM and a DVD-ROM. Also, the non-transitory medium is a tangible medium. Meanwhile, an electric signal which carries a program which is downloaded from a server or the like on the Internet is a computer-readable signal medium which is one type of computer-readable medium, but is not included in non-transitory computer-readable storage media.

The programs stored in the program storage area 32A are executed by the CPU 31. However, in this specification, the operation of each program may be described without mentioning the CPU 31. That is, in the following description, a description "a program "A" performs a process "A"" may mean that "the CPU 31 performs the process "A" described in the program "A"". This meaning is common to the portable terminal 50 to be described below.

Also, the programs stored in the program storage area 32A determine events and operate according to the determination results. However, in this specification, the operation of each program may be described without describing the determination process. In other words, in the following description, a description "the control program performs a processing "A" according to a condition "A"" may mean that "the control program determines whether the condition "A" is satisfied, and when it is determined that the condition "A" is satisfied, the control program performs the process "A"".

Also, the programs stored in the program storage area 32A specify, acquire, extract, or select data or the like. Processing specifying data or the like is, for example, a process of specifying a data item according to a condition from among a plurality of data items, and storing the specified data item or an information item identifying the specified data item in a predetermined storage area. Information identifying data or the like is, for example, identification information identifying the data or the like, the index of an array where the data or the like is stored, or a pointer of a storage area where the data or the like is stored. This meaning is common to processing a program for acquiring, extracting, or selecting data or the like.

Further, the programs stored in the program storage area 32A acquire data and the like. "A program acquiring data and the like" may for example refer to a process of reading data out of a storage area where the data is stored. "A program acquiring data and the like" may for example refer to a process of receiving data transmitted from an external device. "A program acquiring data and the like" may for example refer to a processing of requesting a reply data to external device, and receiving the data that had been replied from the external device. "A program acquiring data and the like" may for example refer to a process of receiving data that had been output by other program such as OS. "A program acquiring data and the like" may for example refer to a process of requesting data output to another program, and receiving the data that had been output from the other program.

An OS 34 is a system software which provides an API for controlling the printer 11, the scanner 12, the FAX unit 13, the display 23, the user interface 24, the network interface 25, and so on which are hardware constituting the MFP 10. That is, each of the above described programs controls a corresponding piece of hardware by calling the API which is provided by the OS 34. However, in this specification, the operation of each program may be described without mentioning the OS 34. That is, in the following description, a description that "a program "B" controls hardware "C"" may mean that "the program "B" controls the hardware "C" via the API of the OS 34." The same applies to the portable terminal 50 to be described below.

Notably, the configuration of the MFP 10A is identical to the aforementioned MFP 10, thus the description thereof will be omitted.

As shown in FIG. 1, the portable terminal 50 mainly includes a display 53, a user interface 54, a network interface 55, a telephone unit 56, a CPU 61, a memory 62, and a communication bus 63. The display 53, the user interface 54, the network interface 55, the CPU 61, the memory 62, and the communication bus 63 which are included in the portable terminal 50 are similar to the display 23, the user interface 24, the network interface 25, the CPU 31, the memory 32, and the communication bus 33 which are included in the MFP 10, and thus repetitive descriptions thereof will not be made. Examples of the portable terminal 50 are a smart phone, a portable phone, and a tablet terminal.

The telephone unit 56 facilitates a call function of transmitting and receiving audio data to and from an external device through a base station B connected via a mobile communication line.

A program storage area 62A of the memory 62 stores an OS 64, a multi-function peripheral control program 65 (referred to as MFP control program 65), and a telephone program 66.

The OS 64 may for example be Android (registered trademark of Google Inc.) OS, iOS (registered trademark of Cisco Systems, Inc.), or Windows Phone (registered trademark of Microsoft Corporation) Operating System.

The MFP control program 65 is a program that is executed to: receive designation of data to be transmitted by FAX transmission (hereinbelow denoted "FAX image data") and a phone number specifying an external device that is to be the destination of the FAX transmission; and cause a selected device to perform a FAX transmission operation. The FAX transmission operation is an operation to transmit a facsimile of the FAX image data to the external device that is to be the destination of the FAX transmission. Details of the processes executed by the MFP control program 65 will be described later.

The telephone program 66 receives a user operation designating a phone number through the user interface 54, and requests to connect to the external device specified by the phone number. Further, when the connection is accepted by the external device, the telephone program 66 transmits and receives audio data through the telephone unit 56 to and from the external device.

Moreover, the memory 62 may store a variety of content data. The content data may for example be image data, photo image data, document data, calculation table data, presentation data, or the like. Notably, the MFP control program 65 is capable of converting the content data to image data having a data format on which the selected device is capable of performing the FAX transmission.

Further, the memory 62 stores a selected device storage table TB1 and a setting information storage table TB2. FIG. 15 shows an example of the selected device storage table TB1. The selected device storage table TB1 stores selected device information 201. The selected device information 201 is information indicating a selected device, which is a device selected by the user from among a plurality of devices. The selected device is a device selected by the user of the MFP control program 65 to execute a scan process and a FAX transmission process. The selected device information 201 includes an IP address 202, a model name 203, and a FAX transmittable size 204. The IP address 202 is an IP address of the selected device. The model name 203 is identification information indicating a model of the selected device. An example of the model name 203 includes a model number. The FAX transmittable size 204 is information indicating a document size that the selected device is capable of transmitting and receiving by FAX. For example, in a case where a scanner of the selected device is a compact scanner that can handle documents up to A4 size, the FAX transmittable size 204 thereof would be "postcard, letter, B5, and A4". In this case, the FAX transmittable size 204 would not include document sizes such as "B4 and A3". In this example shown in the present embodiment, a case where the MFP 10 is selected as the selected device will be described below.

FIG. 16 shows an example of the setting information storage table TB2. The setting information storage table TB2 includes a default FAX image setting area R0, a first default scan image setting area R1, and a second default scan image setting area R2. The default FAX image setting area R0 stores default FAX image setting information 210. The first default scan image setting area R1 stores first default scan image setting information 211. The second default scan image setting area R2 stores second default scan image setting information 212. The default FAX image setting information 210 and the first default scan image setting information 211 are setting information used when executing "scan-to-fax process". On the other hand, the second default scan image setting information 212 is setting information used when executing "scan process".

The "scan-to-fax process" is a process of transmitting scan data, which was generated by executing the scan process in the selected device, from the selected device by FAX. The scan-to-fax process is executed in the selected device by transmitting first FAX instruction information and first FAX image data to the selected device in S165 to be described later. The "scan process" is a process of causing the scan image data, which was generated by executing the scan process in the selected device, to be stored in the memory 62 of the portable terminal 50. The scan process is executed by transmitting third scan instruction information to the selected device in S340 to be described later.

The default FAX image setting information 210 is a default setting value related to FAX transmission that is used in common for both the "scan-to-fax process" and "stored image data FAX process". The "stored image data FAX process" is a process of generating FAX image data in the selected device on the basis of stored image data stored in the memory 62 of the portable terminal 50, and transmitting the FAX image data by FAX. The stored image data is the aforementioned content data, or image data generated by converting the content data.

The first default scan image setting information 211 is information indicating various setting values of first scan image data generated in the "scan-to-fax process". The first scan image data can be received from the selected device in S142 to be described later. The second default scan image setting information 212 is information indicating various setting values of second scan image data generated in the "scan process". The second scan image data can be received from the selected device in S345 to be described later.

Further, the default FAX image setting information 210, the first default scan image setting information 211, and the second default scan image setting information 212 each contain document size information 221 and color information 222. The document size information 221 is information that defines sizes of documents to be read when generating the FAX image data, the first scan image data, and the second scan image data. The document size information 221 may take on various values. For example, it may be a value that indicates a paper size defined by industrial standard, such as the "letter size" and "A4 size". Further, for example, it may be a value indicating a number of horizontal and vertical pixels in an image, or a value indicating horizontal and vertical lengths. The color information 222 is information indicating whether the FAX image data, the first scan image data, and the second scan image data are color images or monochrome images. Aside from the document size information 221 and the color information 222, the default FAX image setting information 210 may include setting information that is not shown, which indicates some properties of the image to be transmitted in the FAX transmission process. The first default scan image setting information 211 and the second default scan image setting information 212 may include setting information that is not shown, which indicates some properties of the image to be transmitted in the scan process.

An operation of the FAX system 100 of the present embodiment will be described with reference to FIGS. 2A to 6. When the MFP control program 65 is executed, a flow of FIG. 2A starts. In S80, the MFP control program 65 reads the selected device information 201 from the selected device storage table TB1.

In S90, the MFP control program 65 causes the display 53 to display a main screen G1. The main screen G1 is a screen that is to receive a device selecting operation, a scan instructing operation, a FAX instructing operation, a print instructing operation, and the like via the touch panel. The device selecting operation is an operation of selecting, between the MFPs 10 and 10A, a selected device that is to execute the scan process and the FAX transmission process. The scan instructing operation is an operation of instructing the execution of the scan process to the selected device. The FAX instructing operation is an operation of instructing the execution of the FAX transmission process to the selected device. The FAX transmission process includes the aforementioned "scan-to-fax process" and "stored image data FAX process". The print instructing operation is an operation of instructing the execution of the print process to the selected device.

Figure 7:
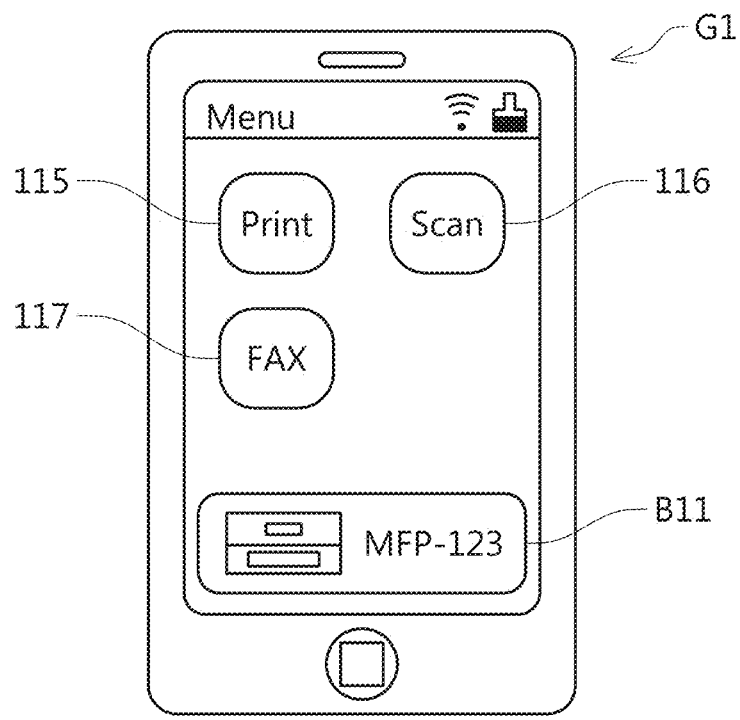
FIG. 7 is an exemplary display of a main screen G1.

An example of the main screen G1 is shown in FIG. 7. The main screen G1 shown in FIG. 7 includes a plurality of icons 115 to 117 and a button B11. Each of the icons 115 to 117 is an image for receiving the corresponding one of the aforementioned print instructing operation, scan instructing operation, and FAX instructing operation. The button B11 is an image for receiving the input of the selecting operation for the selected device.

The OS 64 receives a selection of the icons 115 to 117 via the user interface 54. By receiving the selection of one of the icons 115 to 117, the OS 64 executes a process corresponding to the selected one of the icons 115 to 117 in the foreground.

In S93, the MFP control program 65 determines whether or not the selected device information has been read. When an affirmative determination is made (S93: YES), the MFP control program 65 proceeds to S105, and proceeds to S95 when a negative determination is made (S93: NO). In S95, the MFP control program 65 determines whether or not an input of a device selecting operation has been received. Specifically, a determination is made as to whether or not the button B11 has been selected, and whether or not the process to select the selected device between the MFPs 10 and 10A has been made. When a negative determination is made (S95: NO) the MFP control program 65 returns to S95, and proceeds to S97 when an affirmative determination is made (S95: YES).

In S97, the MFP control program 65 transmits request information for functionality information to the selected device via the network interface 55.

In S100, the MFP control program 65 receives scan functionality information, FAX functionality information, and FAX transmittable size information via the network interface 55 from the selected device to which the request information for the functionality information had been transmitted. The scan functionality information is information indicating values that the selected device supports among values that can be set to the various setting parameters of the scan image data. The FAX functionality information is information indicating values that the selected device supports among values that can be set to the various setting parameters of the FAX image data. The FAX transmittable size information is information indicating a size of a FAX document that the selected device is capable of transmitting. The content of the FAX transmittable size information is similar to the content of the aforementioned document size information 221, so the explanation thereof will be omitted.

The scan functionality information, the FAX functionality information, and the FAX transmittable size information are information used to determine whether or not a document size set by the user is included in the FAX transmittable document sizes of the selected device in S146 to be described later.

In S101, the MFP control program 65 generates the first default scan image setting information 211 and the aforementioned second default scan image setting information 212. The first default scan image setting information 211 is information that reflects the scan functionality information and the FAX functionality information that were received in S100. The first default scan image setting information 211 is a variety of setting information for scan image data to be generated in the scan process executed by the selected device. The second default scan image setting information 212 is information that reflects the received scan functionality information.

In S103, the MFP control program 65 stores the generated first default scan image setting information 211 in the first default scan image setting area R1 of the setting information storage table TB2. Further, it also stores the generated second default scan image setting information 212 in the second default scan image setting area R2.

In S105, the MFP control program 65 receives an input of the user operation, and determines a content of the received user operation. When an input of the print instructing operation is received (S105: print instruction), the MFP control program 65 proceeds to S110. In S110, the MFP control program 65 transmits, to the selected device, information for instructing to execute a print process and print image data. The process flow is then terminated.

Figure 8:
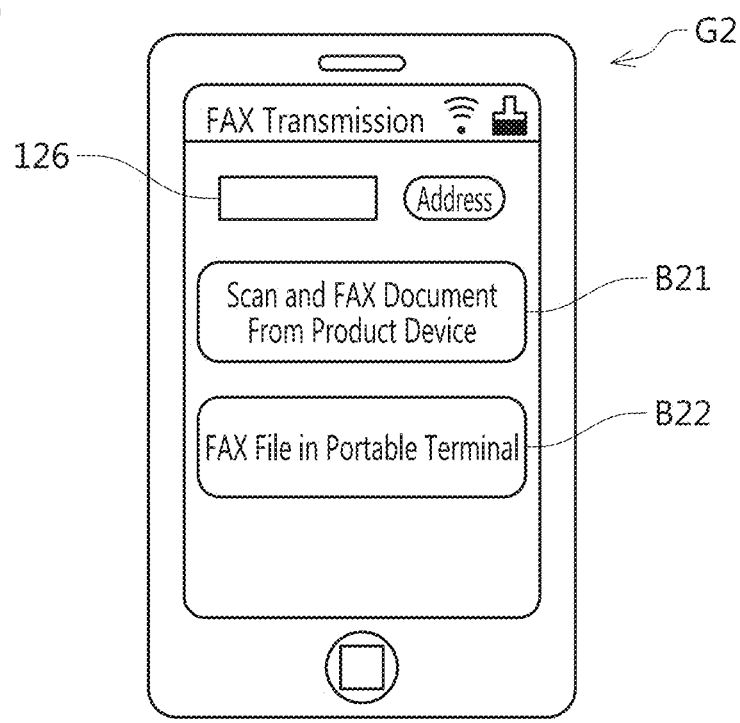
FIG. 8 is an exemplary display of a source selection screen G2.

On the other hand, when an input of the FAX instructing operation is received in S105 (S105: FAX instruction), the MFP control program 65 proceeds to S115. In S115, the MFP control program 65 displays a source selection screen G2 on the display 53. FIG. 8 shows an example of the source selection screen G2. The source selection screen G2 includes button images B21 and B22, and an input box image 126. The button image B21 is an image for receiving a scan image transmitting operation. The scan image transmitting operation is an operation for instructing the selected device to transmit, by FAX transmission, the scan image data generated in the selected device by executing the scan process. The button image B22 is an image for receiving an input of an internal image transmitting operation. The internal image transmitting operation is an operation for instructing the selected device to transmit, by FAX transmission, stored image data stored in the memory 62 of the portable terminal 50. The input box image 126 is an image for receiving an input of an execution instruction for a destination input process. The destination input process is a process for prompting the user to input address information indicating a destination address of transmission of the FAX image data.

In S120, the MFP control program 65 receives an input of the user operation, and determines a content of the received user operation. When an input of the scan image transmitting operation is received (S120: scan image transmission), the MFP control program 65 proceeds to S123.

In S123, the MFP control program 65 reads out the first default scan image setting information 211 from the first default scan image setting area R1 of the setting information storage table TB2.

Figure 9:
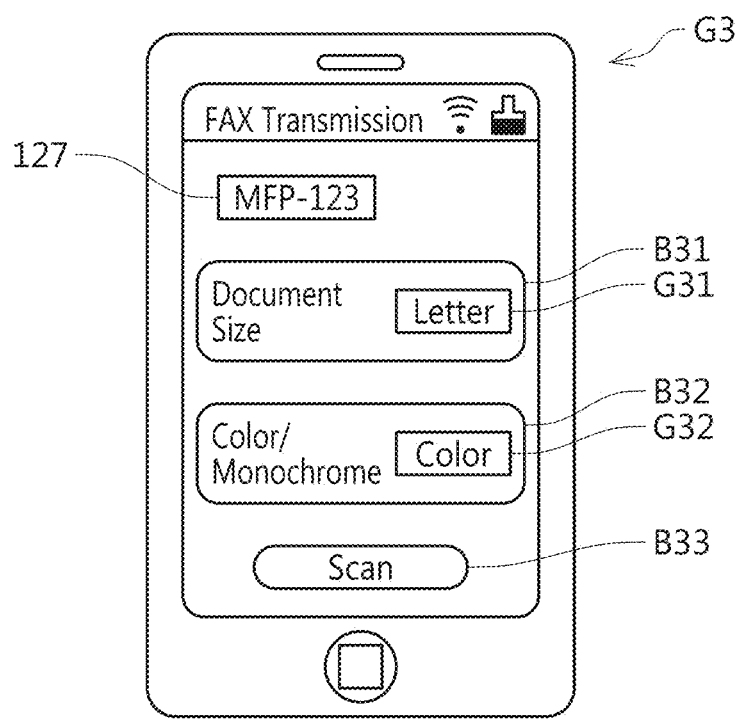
FIG. 9 is an exemplary display of a scan setting screen G3.

In S125, the MFP control program 65 displays a scan setting screen G3 on the display 53. FIG. 9 shows an example of the scan setting screen G3. The scan setting screen G3 includes button images B31 to B33, and a model name image 127.

The button image B31 includes a setting value image G31. The setting value image G31 is an image showing a content of the document size information 221 included in the first default scan image setting information 211. The button image B31 can receive an input of a document size selecting operation for selecting a value for the document size information 221. That is, the first default scan image setting information 211 read from the first default scan image setting area R1 in S123 includes a default value of the document size information 221. The button image B31 can receive the operation to change the default value of the document size information 221.

The button image B32 includes a setting value image G32. The setting value image G32 is an image showing a content of the color information 222 included in the first default scan image setting information 211. The button image B32 can receive an input of a color/monochrome selecting operation for selecting the content of the color information 222. That is, the first default scan image setting information 211 read from the first default scan image setting area R1 in S123 includes a default value of the color information 222. The button image B32 can receive the operation to change the default value of the color information 222.

The button image B33 is an image for receiving an input of a scan starting operation. The scan starting operation is an operation to instruct the selected device to start the scan process. The model name image 127 is an image showing a model name of the selected device.

In S130, the MFP control program 65 receives an input of the user operation and determines a content of the received user operation. When an input of a document size selecting operation or a color/monochrome selecting operation is received (S130: document size, color/monochrome selection), the MFP control program 65 proceeds to S135.

In S135, the MFP control program 65 modifies the first default scan image setting information 211. For example, when the document size selecting operation is inputted, the value of the document size information 221 included in the first default scan image setting information 211 read in S123 is changed to a value inputted by the user in S130. Then, the value of the modified document size information 221 is stored in the first default scan image setting area R1. The MFP control program 65 thereafter returns to S130.

On the other hand, when the input of the scan starting operation is received in S130 (S130: scan start), the MFP control program 65 proceeds to S140. In S140, the MFP control program 65 transmits first scan instruction information or second scan instruction information to the selected device via the network interface 55. The first scan instruction information is information that is transmitted when the scan starting operation was received after having received the document size selecting operation and/or the color/monochrome selecting operation. That is, the first scan instruction information is information for instructing the selected device to modify the content of the first default scan image setting information 211 read from the first default scan image setting area R1 in S123, and then to generate the first scan image data by a scan process that uses the modified scan image setting information. On the other hand, the second scan instruction information is information that is transmitted when the scan starting operation was received without having received the document size selecting operation and/or the color/monochrome selecting operation. That is, the second scan instruction information is information for instructing the selected device to generate the first scan image data by a scan process that uses the first default scan image setting information 211 read from the first default scan image setting area R1 in S123 without making any modification thereto.

In S142, the MFP control program 65 determines whether or not the first scan image data generated in the selected device has been received from the selected device via the network interface 55. When a negative determination is made (S142: NO), the MFP control program 65 returns to S142, and proceeds to S144 when an affirmative determination is made (S142: YES).

In S144, the MFP control program 65 reads the default FAX image setting information 210 stored in the default FAX image setting area R0 of the setting information storage table TB2. Further, the selected device information 201 is read from the selected device storage table TB1.

In S146, the MFP control program 65 determines whether or not the set document size is within a range of document sizes that can actually be transmitted by FAX in the selected device. Specifically, the document size information 221 stored in the first default scan image setting area R1 of the setting information storage table TB2 is read. Then, a determination is made as to whether or not the document size indicated by the read document size information 221 is included in the range of document sizes indicated by the FAX transmittable size 204 included in the selected device information 201 read in S144, The MFP control program 65 proceeds to S148 when an affirmative determination is made (S146: YES). Specifically, a case where the FAX transmittable size 204 indicates "A4" and "Letter" will be simulated. The affirmative determination is made in S146 when the document size information indicates "A4", and the negative determination is made in S146 when the document size information indicates "A3".

In S148, the MFP control program 65 generates first FAX image setting information 231 that reflects the first default scan image setting information 211. The first FAX image setting information 231 is information indicating various setting contents of the FAX image data transmitted in the FAX transmission process executed in the selected device. FIG. 17 shows an example of the setting contents of the first FAX image setting information 231. The first FAX image setting information 231 includes document size information 321 and color information 322. Since contents of the document size information 321 and the color information 322 are similar to the contents of the aforementioned document size information 221 and color information 222, the description thereof will be omitted. That is, the first FAX image setting information 231 and the first default scan image setting information 211 have the document size information and the color information as their common setting parameters.

The MFP control program 65 copies the values of the document size information 221 and color information 222 in the first default scan image setting information 211 to the document size information 321 and the color information 322 in the first FAX image setting information 231. The first default scan image setting information 211 can thereby be reflected to the first FAX image setting information 231.

A specific example will be given. A case where the scan starting operation is received in S130 after having received the document size selecting operation and the color/monochrome selecting operation will be considered. In this case, the content of the first default scan image setting information 211 read from the first default scan image setting area R1 of the setting information storage table TB2 has been modified.

Then the values of the document size information 221 and color information 222 in the modified first default scan image setting information 211 are copied to the document size information 321 and the color information 322 of the first FAX image setting information 231.

Further, a case where the scan starting operation is received in S130 without having received the document size selecting operation and the color/monochrome selecting operation will be considered. In this case, the content of the first default scan image setting information 211 read from the first default scan image setting area R1 of the setting information storage table TB2 is not modified. Thus, the values of the document size information 221 and color information 222 in the unmodified first default scan image setting information 211 are copied to the document size information 321 and the color information 322 of the first FAX image setting information 231.

Figure 10:
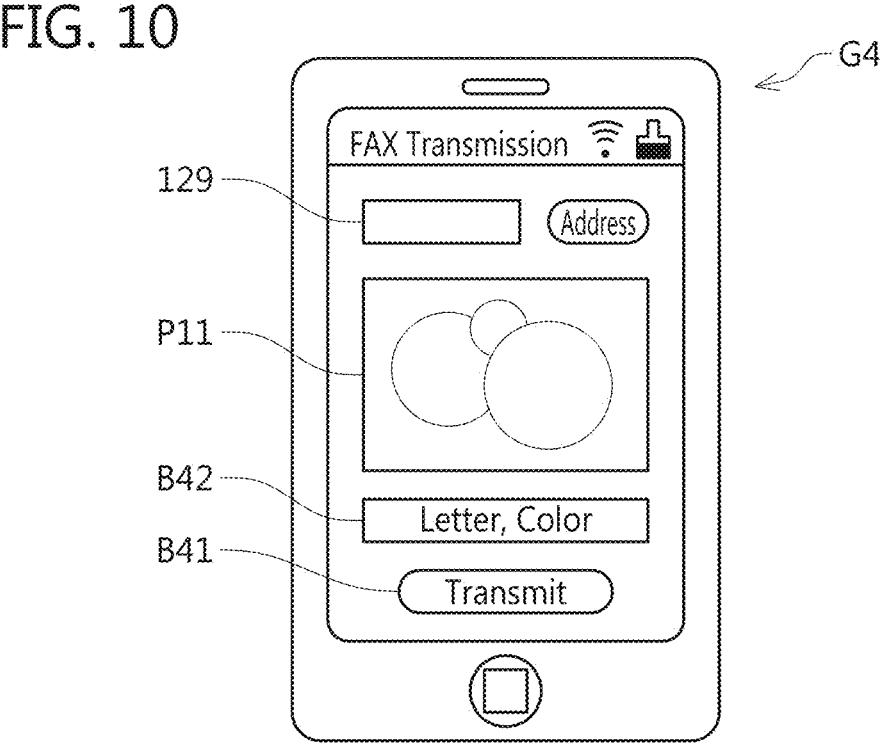
FIG. 10 is an exemplary display of a FAX transmission screen G4.

In S150, the MFP control program 65 displays a FAX transmission screen G4 on the display 53. FIG. 10 shows an example of the FAX transmission screen G4. The FAX transmission screen G4 includes a preview image P11, button images B41 and B42, and an input box image 129. The preview image P11 is an image indicated by the first scan image data received in S142. Further, the preview image P11 is an image in which the first FAX image setting information 231 generated in S148 has been reflected. For example, when the color information 322 is "monochrome", the preview image P11 is displayed in monochrome color. The button image B42 is an image that displays a content of the first FAX image setting information 231 generated in S148, and is for receiving an operation to modify the content of the first FAX image setting information 231. In the example of FIG. 10, the contents of the document size information 321 and color information 322 are displayed in B42. The button image B41 is an image for receiving an input of a FAX starting operation. The FAX starting operation is an operation for instructing the selected device to start the FAX transmission process. A content of the input box image 129 is similar to the content of the input box image 126 mentioned previously in FIG. 8, so the description thereof will be omitted herein.

On the other hand, when a negative determination is made in S146 (S146: NO), the MFP control program 65 proceeds to S152. In S152, the MFP control program 65 generates second FAX image setting information 232 that reflects the default FAX image setting information 210 read in S144. The second FAX image setting information 232 is information indicating various setting contents of the FAX image data transmitted in the FAX transmission process executed in the selected device. The second FAX image setting information 232 is information that is used to execute a process to change the image size of the scan image data to a size that can be transmitted in the FAX transmission process in S163 to be described later.

FIG. 17 shows an example of a setting content of the second FAX image setting information 232. The content of the second FAX image setting information 232 is similar to the content of the aforementioned first FAX image setting information 231, so the description thereof will be omitted herein.

The MFP control program 65 copies the values of the document size information 221 and color information 222 in the default FAX image setting information 210 to the document size information 321 and the color information 322 in the first FAX image setting information 231. The default FAX image setting information 210 can thereby be reflected to the second FAX image setting information 232.

Figure 11:
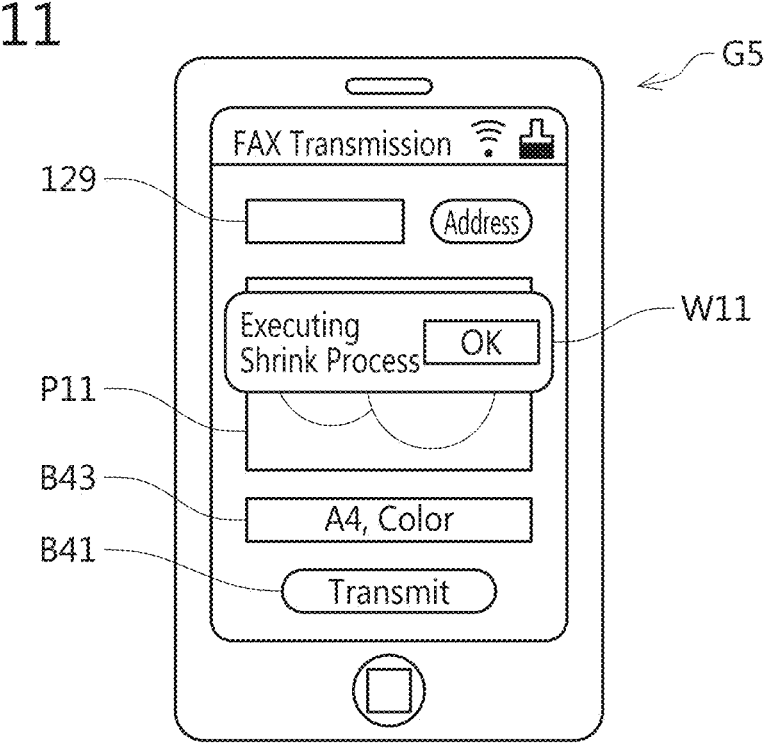
FIG. 11 is an exemplary display of a FAX transmission screen G5.
Figure 12:
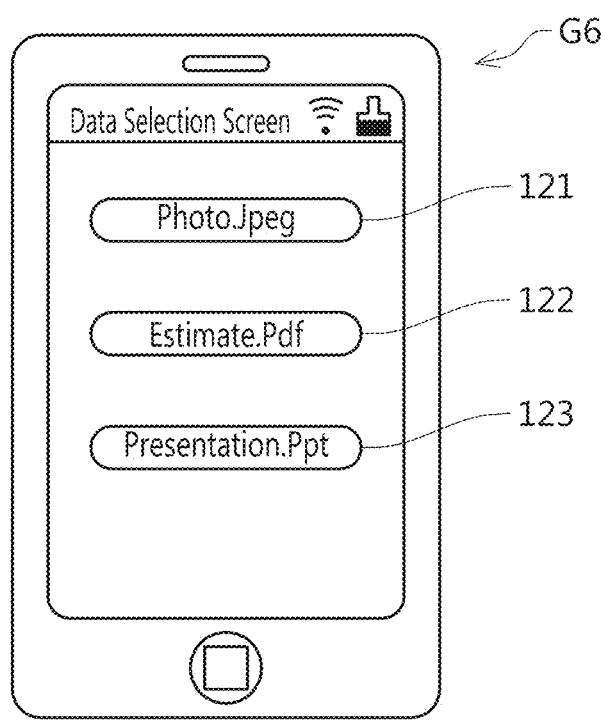
FIG. 12 is an exemplary display of a data selection screen G6.

In S154, the MFP control program 65 displays a FAX transmission screen G5 on the display 53. FIG. 11 shows an example of the FAX transmission screen G5. The FAX transmission screen G5 includes a preview image P11, button images B41 and B43, and a pop-up image W11. The pop-up image W11 is an image indicating that a process to shrink the scan image data is to be executed. The button image B43 is an image that displays a content of the second FAX image setting information 232 generated in S152, and is for receiving an operation to modify the content of the second FAX image setting information 232. The preview image P11 is an image in which the second FAX image setting information 232 generated in S152 has been reflected. Notably, contents of the button image B41 and the input box image 129 have already been described using FIG. 10, thus the description thereof will be omitted herein.

The FAX transmission screen G5 of FIG. 11 includes the pop-up image W11. On the other hand, the FAX transmission screen G4 of FIG. 10 does not include any pop-up image. In this point, the FAX transmission screen G5 can be said as being displayed in a configuration different from that of the FAX transmission screen G4.

In S155, the MFP control program 65 receives an input of the user operation, and determines a content of the received user operation. When a tap input to the input box image 129 is detected in a state where the FAX transmission screen G4 of FIG. 10 or the FAX transmission screen G5 of FIG. 10 is being displayed, it is determined as that an input of a destination inputting operation has been received (S155: destination input). Then, the MFP control program 65 proceeds to S160. In S160, the MFP control program 65 executes a destination input process. Then, the MFP control program 65 returns to S155.

Further, when the tap input to the button image B42 of FIG. 10 or to the button image B43 of FIG. 11 is detected, a determination is made as that an input of the execution instruction for a FAX setting process has been received (S155: FAX setting), and the MFP control program 65 proceeds to S157. In S157, the MFP control program 65 receives a modification to the content of the first FAX image setting information 231 generated in S148 when the tap input to the button image B42 is detected. Further, when the tap input to the button image B43 is detected, the MFP control program 65 receives a modification to the content of the second FAX image setting information 232 generated in S152. Notably, a range of the setting values for which the modifications to the contents of the first FAX image setting information 231 and the second FAX image setting information 232 can be received are within a range of the setting value indicated by the FAX transmittable size 204 included in the selected device information 201. That is, a modification to a setting value that the selected device cannot transmit FAX cannot be made.

In S159, the MFP control program 65 displays on the FAX transmission screen G4 the button image B42 that indicates the content of the modified first FAX image setting information 231 when the content of the first FAX image setting information 231 has been modified. Further, the MFP control program 65 displays on the FAX transmission screen G5 the button image B43 that indicates the content of the modified second FAX image setting information 232 when the content of the second FAX image setting information 232 has been modified. Then, the MFP control program 65 returns to S155.

Further, when a tap input to the button image B41 is detected in the state where the FAX transmission screen G4 of FIG. 10 or the FAX transmission screen G5 of FIG. 10 is being displayed, it is determined as that an input of a FAX starting operation has been received (S155: FAX start). Then, the MFP control program 65 proceeds to S163.

In S163, the MFP control program 65 generates first FAX image data. Specifically, when an affirmative determination is made in S146, the first FAX image data is generated by processing the first scan image data. The first FAX image data has properties as indicated by the document size information 221 and the color information 222 included in the first FAX image setting information 231. On the other hand, in a case where a negative determination is made in S146, the first FAX image data is generated by processing the first scan image data. The first FAX image data has properties as indicated by the document size information 221 and the color information 222 included in the second FAX image setting information 232. The second FAX image setting information 232 is information that reflects the default FAX image setting information 210. Thus, it becomes possible to change the size of the image indicated by the first FAX image data to the size of the image indicated by the document size information 221 that is indicated by the default FAX image setting information 210.

In S165, the MFP control program 65 transmits the first FAX instruction information and the first FAX image data to the selected device via the network interface 55. The first FAX instruction information is information for instructing the selected device to transmit the first FAX image data to the transmission destination indicated by the address information inputted in S160.

In S166, the MFP control program 65 determines whether or not a negative determination was made in S146. An embodiment of this determination will be described. The MFP control program 65 stores flag information indicating the determination result outputted in S146 in the memory 62. In S166, the MFP control program 65 reads the flag information from the memory 62, and determines the determined content of S146. The process flow is terminated when a negative determination is made in S146 (S166: YES), and proceeds to S167 when an affirmative determination is made in S146 (S166: NO). In S167, the MFP control program 65 determines whether or not the value of the first FAX image setting information 231 that was generated in S148 and the value of the default FAX image setting information 210 read from the default FAX image setting area R0 in S144 match. The process flow is terminated when an affirmative determination is made (S167: YES), and the MFP control program 65 proceeds to S169 when a negative determination is made (S167: NO).

In S169, the MFP control program 65 overwrites and stores the first FAX image setting information 231 used in S163 in the default FAX image setting area R0 of the setting information storage table TB2. That is, the first FAX image setting information 231 generated in S148 is stored as new default FAX image setting information 210. Then, the process flow is terminated.

Further, when an input of an internal image transmitting operation is received in S120 of FIG. 2A (S120: internal image transmission), the MFP control program 65 proceeds to S200. In S200, the MFP control program 65 displays the data selection screen G6 in the display 53. The data selection screen G6 includes a plurality of data icons 121, 122, 123. The data icons 121 to 123 are images corresponding to content data that can be designated as targets of the FAX transmission.

In S201, the MFP control program 65 determines whether or not a selection of one of the data icons 121 to 123 has been received via the user interface 54. When a negative determination is made (S201: NO), the MFP control program 65 returns to S201, and when an affirmative determination is made (S201: YES), the MFP control program 65 proceeds to S205.

In S205, the MFP control program 65 temporarily stores content data corresponding to the selected data icon in the memory 62.

In S211, the MFP control program 65 reads the selected device information 201 from the selected device storage table TB1. Further, it reads the default FAX image setting information 210 from the default FAX image setting area R0 of the setting information storage table TB2.

In S212, the MFP control program 65 generates third FAX image setting information 233 that reflects the default FAX image setting information 210 that has been read. The third FAX image setting information 233 is information indicating various setting contents that are used for generating the FAX image data from the stored image data being stored in the memory 62. FIG. 17 shows an example of the setting contents of the third FAX image setting information 233. The third FAX image setting information 233 includes document size information 321 and color information 322. Since the contents of the document size information 321 and the color information 322 have already been described, the description thereof will be omitted herein.

Figure 13:
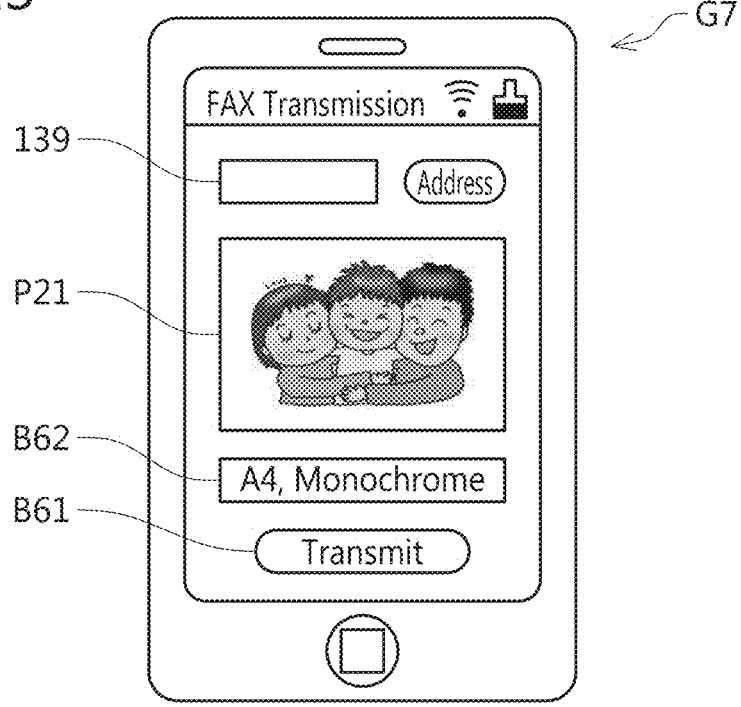
FIG. 13 is an exemplary display of a preview screen G7.

In S213, the MFP control program 65 displays a preview screen G7 on the display 53. FIG. 13 shows an example of the preview screen G7. The preview screen G7 includes a preview image P21, button images B61 and B62, and an input box image 139. The preview image P21 is an image indicated by the content data stored in S205. The contents of the button images B61 and B62 and the input box image 139 are similar to the aforementioned button images B41 and B42 and input box image 129, so the description thereof will be omitted herein. Then, the MFP control program 65 proceeds to S214.

The contents of respective ones of S214, S215, S230, and S235 are similar to those of S155, S160, S157, and S159 as mentioned above using FIG. 3, thus the description thereof will be omitted herein.

Further, when a tap input to the button image B61 is detected in a state where the preview screen G7 of FIG. 13 is being displayed, it is determined as that an input of the FAX starting operation has been received (S214: FAX start). Then, the MFP control program 65 proceeds to S218.

In S218, the MFP control program 65 generates second FAX image data. Specifically, the second FAX image data is generated by proceeding the content data. The second FAX image data has properties indicated by the document size information 221 and color information 222 included in the third FAX image setting information 233 generated in S212.

In S221, the MFP control program 65 transmits the second FAX instruction information and the second FAX image data to the selected device via the network interface 55. The second FAX instruction information is information for instructing the selected device to transmit the second FAX image data to the transmission destination indicated by the address information inputted in S215. Then, the process flow is terminated.

Figure 5:
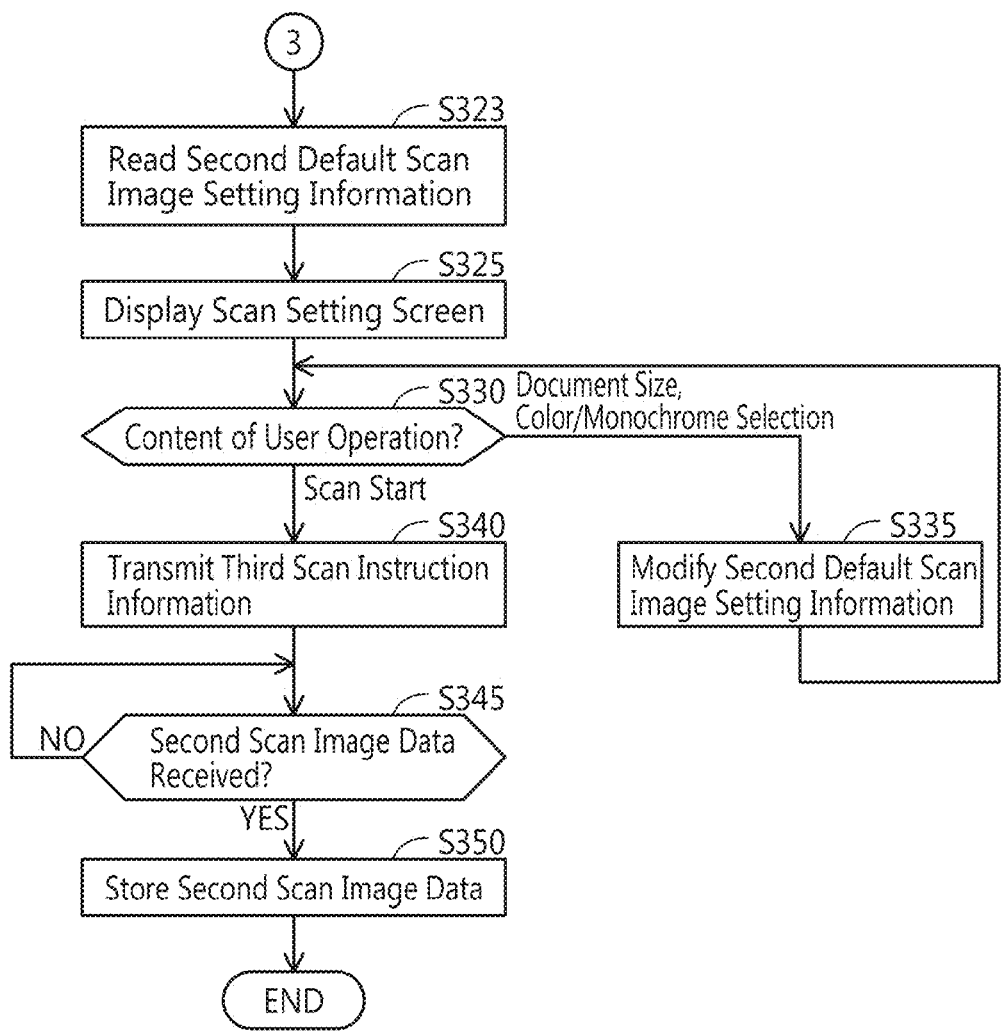
FIG. 5 is a flowchart of a process executed by the multi-function peripheral control program 65.

Further, when an input of the scan instructing operation is received in S105 of FIG. 2A (S105: scan instruction), the MFP control program 65 proceeds to S323 of FIG. 5. In S323, the MFP control program 65 reads the second default scan image setting information 212 from the second default scan image setting area R2 of the setting information storage table TB2.

Figure 14:
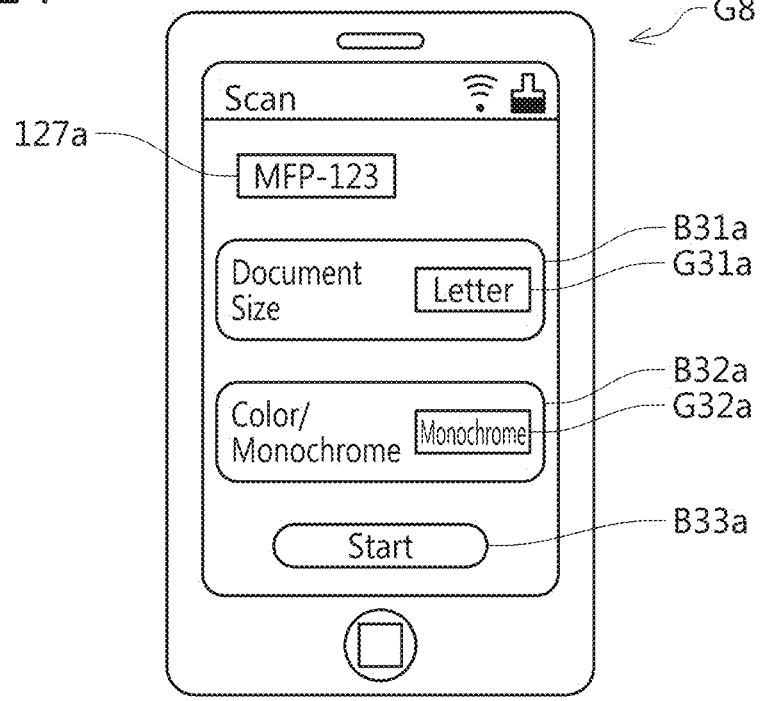
FIG. 14 is an exemplary display of a scan setting screen G8.

In S325, the MFP control program 65 displays a scan setting screen G8 on the display 53. FIG. 14 shows an example of the scan setting screen G8. The scan setting screen G8 includes button images B31a to B33a and a model name image 127a. The button image B31a includes a setting value image G31a. The setting value image G31a is an image indicating a content of the document size information 221 included in the second default scan image setting information 212. The button image B31a can receive an input of the document size selecting operation for changing the value of the document size information 221 included in the second default scan image setting information 212. The button image B32a includes a setting value image G32a. The setting value image G32a is an image indicating a content of the color information 222 included in the second default scan image setting information 212. The button image B32a can receive an input of the color/monochrome selecting operation for changing the content of the color information 222 included in the second default scan image setting information 212. Notably, the contents of respective ones of button image B33a and model name image 127a are similar to those of the button image B33 and model name image 127 as mentioned above using FIG. 9, thus the description thereof will be omitted herein.

In S330, the MFP control program 65 receives an input of the user operation, and determines a content of the received user operation. The MFP control program 65 proceeds to S335 when the document size selecting operation or color/monochrome selecting operation is received (S330: document size, color/monochrome selection). In S335, the MFP control program 65 modifies the content of the second default scan image setting information 212 according to the user's operation. Then, the MFP control program 65 returns to S330.

On the other hand, when an input of the scan starting operation is received in S330 (S130: scan start), the MFP control program 65 proceeds to S340. In S340, the MFP control program 65 transmits the third scan instruction information via the network interface 55. The third scan instruction information is information for instructing the selected device to generate the second scan image data by using second default scan image setting information 212 read from the second default scan image setting area R2.

In S345, the MFP control program 65 determines whether or not the second scan image data generated in the selected device has been received from the selected device via the network interface 55. When a negative determination is made (S345: NO), the MFP control program 65 returns to S345, and proceeds to S350 when an affirmative determination is made (S345: YES).

In S350, the MFP control program 65 stores the received second scan image data in the memory 62. Then, the process flow is terminated.

Figure 6:
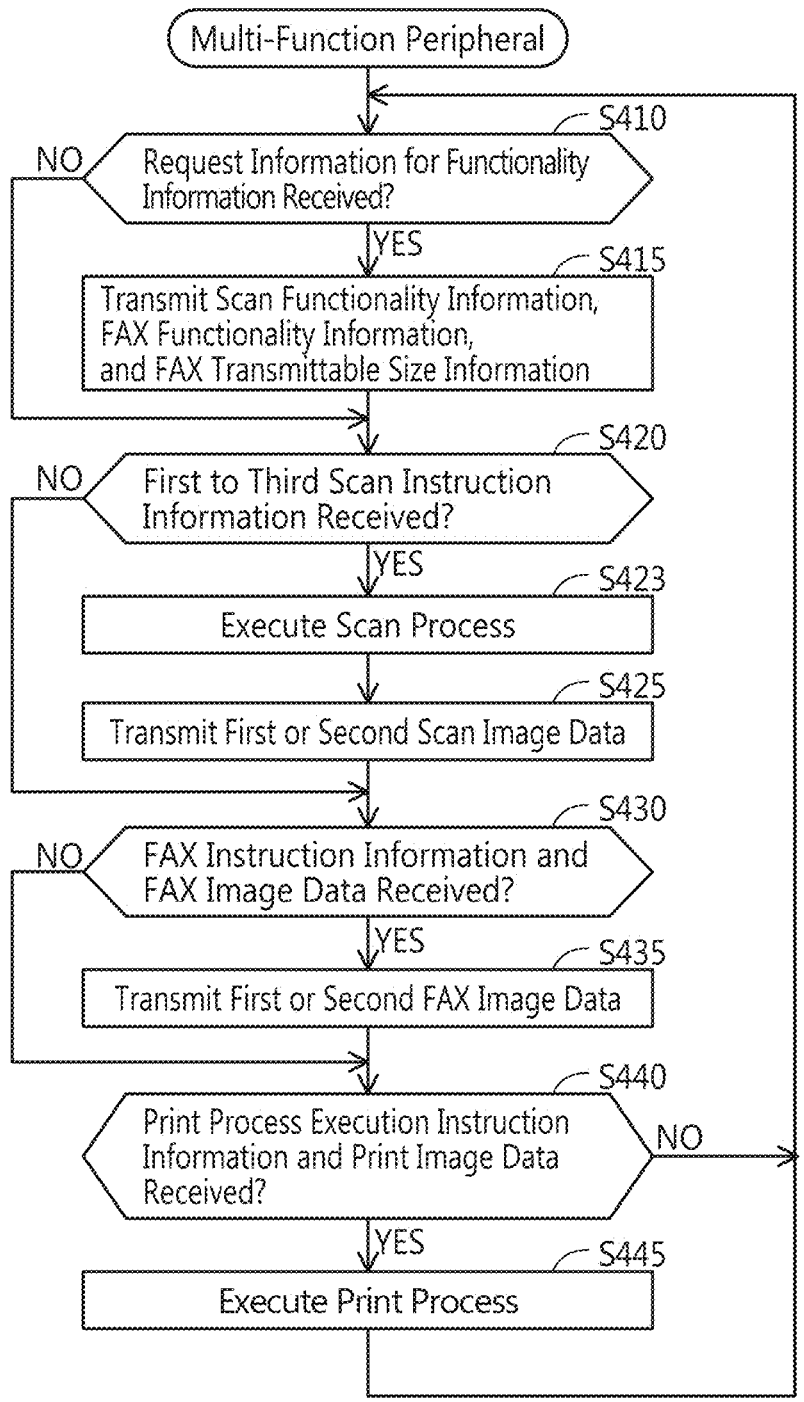
FIG. 6 is an operation flowchart of a multi-function peripheral 10.

An operation of the MFP 10 being the selected device will be described using a process flow of FIG. 6. In S410, the control program 35 of the MFP 10 determines whether or not the request information for the functionality information has been received from the external device. When a negative determination is made (S410: NO), the control program 35 proceeds to S420, and proceeds to S415 when an affirmative determination is made (S410: YES).

In S415, the control program 35 transmits scan functionality information, FAX functionality information, and FAX transmittable size information to the external device that had transmitted the request information for the functionality information. Contents of these information have already been described in S100, thus the description thereof is omitted herein.

In S420, the control program 35 determined whether or not one of the first to third scan instruction information has been received from the external device. When a negative determination is made (S420: NO), the control program 35 proceeds to S430, and proceeds to S423 when an affirmative determination is made (S420: YES).

When the first or second scan instruction information is received, the control program 35 causes the scanner 12 to execute the scan process in S423 based on the first default scan image setting information 211 included in the received first or second scan instruction information. As a result, the first scan image data is generated. Further, when the third scan instruction information is received, the control program 35 causes the scanner 12 to execute the scan process based on the second default scan image setting information 212 included in the received third scan instruction information. As a result, the second scan image data is generated.

When the first scan image data has been generated, the control program 35 transmits the generated first scan image data in S425 to the external device that had transmitted the first or second scan instruction information. Further, when the second scan image data has been generated, the control program 35 transmits the generated second scan image data to the external device that had transmitted the third scan instruction information.

In S430, the control program 35 determines whether or not the first FAX instruction information and first FAX image data, or the second FAX instruction information and the second FAX image data have been received from the external device. When a negative determination is made (S430: NO), the control program 35 proceeds to S440, and proceeds to S435 when an affirmative determination is made (S430: YES).

In S435, when the first FAX instruction information and first FAX image data are received, the control program 35 causes the FAX unit 13 to execute a process of transmitting the first FAX image data to the transmission destination indicated by the first FAX instruction information. Further, when the second FAX instruction information and second FAX image data are received, the control program 35 causes the FAX unit 13 to execute a process of transmitting the second FAX image data to the transmission destination indicated by the second FAX instruction information.

In S440, the control program 35 determines whether or not a print process execution instruction information and print image data have been received from the external device. When a negative determination is made (S440: NO), the control program 35 returns to S410, and proceeds to S445 when an affirmative determination is made (S440: YES). In S445, the control program 35 causes the printer 11 to execute a print process using the received print image data. Then, the control program 35 returns to S410.

(Effects of Embodiment)

According to the above embodiment, in executing the "scan-to-fax process", the content of the first default scan image setting information 211 can firstly be determined (S130, S135). The first default scan image setting information 211 is information indicating the content of the various settings of the first scan image data generated in the scan process. Next, the determined content of the first default scan image setting information 211 can be reflected to the content of the first FAX image setting information 231 (S148). The first FAX image setting information 231 is information indicating the content of the various settings of the FAX image data that is transmitted in the FAX transmission process executed in the selected device. Specifically, the values of the document size information 221 and the color information 222 of the first default scan image setting information 211 can be copied to the values of the document size information 321 and the color information 322 of the first FAX image setting information 231. Due to this, in executing the "scan-to-fax process", the content of the document size information and the color information that had been set in the scan process can be inherited to the FAX process that is executed thereafter. That is, there is no need to perform redundant setting operations of setting the document size information and the color information in the scan process and again setting the document size information and the color information in the FAX process. Burden on the user can be reduced.

According to the above embodiment, the second scan instruction information can be generated when the scan starting operation is inputted without inputting the document size selecting operation and the color/monochrome selecting operation in S130. The second scan instruction information is information instructing the generation of the first scan image data for the FAX transmission using the default values for the document size information 221 and the color information 222. Due to this, the user is enabled to execute the "scan-to-fax process" using the default values. Burden of inputting the document size information and the color information can be omitted.

According to the above embodiment, the first scan instruction information can be generated when the scan starting operation is inputted after having inputted the document size selecting operation and the color/monochrome selecting operation in S130. The first scan instruction information is information instructing the generation of the first scan image data for the FAX transmission using the document size information 221 and the color information 222 that were modified from their default values. Due to this, the "scan-to-fax process" can be performed by using the document size and color information that the user desires.

According to the above embodiment, when the first FAX image setting information 231 is generated in S148, the preview image P11 in the FAX transmission screen G4 displayed in S150 can be made into an image in which the first FAX image setting information 231 is reflected. Further, when the second FAX image setting information 232 is generated in S152, the preview image P11 in the FAX transmission screen G5 displayed in S154 can be made into an image in which the second FAX image setting information 232 is reflected. Due to this, the user can confirm the content of the image to be transmitted by FAX in both cases where the default values of the document size information 221 and the color information 222 were used as they are, and where the default values have been changed.

According to the above embodiment, the second FAX image setting information 232 can be generated by proceeding to S152 when the document size set in the first default scan image setting information 211 is outside the range of the document size that can actually be transmitted by FAX transmission in the selected device (S146: NO). The second FAX image setting information 232 is information that reflects the default FAX image setting information 210. The default FAX image setting information 210 is the default setting value related to FAX transmission, so the document size information 221 included in the default FAX image setting information 210 is a value by which the FAX transmission process can be carried out. According to the above, the image size of the FAX image data can be reduced to the preset default value in cases where the size of the FAX image data to be transmitted in the "scan-to-fax process" becomes larger than the FAX image data size that can be transmitted by the selected device. Thus, the "scan-to-fax process" can be executed with higher stability.

According to the above embodiment, the first FAX image setting information 231 that was generated in S148 can be stored as the new default FAX image setting information 210 (S169). Due to this, the content of the default FAX image setting information 210 can constantly be updated to the content of the first FAX image setting information 231 that the user had set.

According to the above embodiment, in the state where the content of the default FAX image setting information 210 is to constantly be updated to the content of the first FAX image setting information 231 that the user had set, the third FAX image setting information 233 that reflects the updated default FAX image setting information 210 can be generated (S212). The third FAX image setting information 233 is information indicating the various setting contents of the FAX image data to be transmitted in the "stored image data FAX process". Due to this, the FAX transmission can be executed in both cases of performing the "scan-to-fax process" and the "stored image data FAX process" on the basis of the same default FAX image setting information 210. The document size and color information can be prevented from becoming different for the "scan-to-fax process" and the "stored image data FAX process". The user will not be confused by such differences.

According to the above embodiment, the scan setting screen G8 can be displayed on the display 53 (S325) when the "scan process" is to be executed (S105: scan instruction). The setting value images G31a and G32a that contain the content of the document size information 221 and the color information 222 to be used in the "scan process" can be displayed in the scan setting screen G8. Due to this, in each of the cases of executing the "scan-to-fax process" and the case of executing the "scan process", the setting values of the document size and color information can be provided to the user for confirmation. Thus, the user can independently confirm the various setting values for the "scan-to-fax process" and the various setting values of the "scan process", and thereafter cause the selected device to execute the process.

According to the above embodiment, the first default scan image setting information 211 can be generated by reflecting two information received in S100, namely the scan functionality information and the FAX functionality information (S101). Due to this, the first default scan image setting information 211 that is suitable for the "scan-to-fax process" can be generated. Further, the second default scan image setting information 212 can be generated by reflecting one information of the scan functionality information received in S100 (S101). Due to this, the second default scan image setting information 212 suitable for the "scan process" can be generated. According to the above, the "scan-to-fax process" and the "scan process" can suitably be executed on the basis of the scan functionality and the FAX functionality of the selected device.

According to the above embodiment, when the input of the FAX instructing operation is received in S105, the "scan-to-fax process" or the "stored image data FAX process" is executed on the basis of the default FAX image setting information 210 or the first default scan image setting information 211. On the other hand, when the input of the scan instructing operation is received in S105, the "scan process" is executed on the basis of the second default scan image setting information 212. Due to this, the "scan-to-fax process" and "stored image data FAX process" can be executed independently from the "scan process" and vice versa, on the basis of the setting information that are independent of each other. Due to this, the "scan-to-fax process" and "stored image data FAX process" can be prevented from giving influence to the "scan process" and vice versa. As a result, an occurrence of a situation in which a defect that the user did not expect occurs can be prevented.

According to the above embodiment, in the case where the size of the FAX image data to be transmitted in the "scan-to-fax process" becomes larger than the size of the FAX image data that can be transmitted by the selected device (S146: NO), the pop-up image W11 indicating the execution of the process of shrinking the scan image data can be displayed in the FAX transmission screen G5 (S154). Due to this, it becomes possible to suitably notify the user that the scan image data will be shrunk.

(Variants)

When the negative determination is made in S146, the pop-up image W11 displayed in the FAX transmission screen G5 may include a variety of information. For example, the pop-up image W11 may include information that indicates that the document size set in the first default scan image setting information 211 exceeds the document size that is actually FAX transmittable. Due to this, the user can be alerted of the issue.

The default FAX image setting information 210, the first default scan image setting information 211, and the second default scan image setting information 212 may include a variety of information other than the document size information 221 and the color information 222. For example, the FAX image data or information indicating a resolution of the scan image data (for example, 300 dpi) may be included.

The screen capable of receiving a plurality of inputting operations is not limited to one screen. It may be a combination of a plurality of screens. For example, in the scan setting screen G3 of FIG. 9, the button image B33 may not be displayed. In addition to this, a screen including the button image B33 for receiving the input of the scan starting operation may be displayed in response to a completion of the input of the document size selecting operation and/or the color/monochrome selecting operation by tapping on the button images B31 and/or B32. Due to this, the plurality of inputting operations can be received in a wizard format.

In the scan setting screen G3 of FIG. 9, the configurations for receiving the document size selecting operation with the button image B31 and the configurations for receiving the color/monochrome selecting operation with the button image B32 may differ in variety. For example, the configuration in which the content of the setting value image G31 changes by being toggled by tapping on the button image B31 may be employed. Further, for example, a plurality of choices for the document size information may be displayed in a pop-up display or in a different screen display by tapping on the button image B31. Then, the document size information may be selected by tapping on a desired size (for example, A4 size) from among the plurality of choices. Notably, the same applies to the scan setting screen G8 in FIG. 14.

In the FAX transmission screen G4 of FIG. 10 or the FAX transmission screen G5 of FIG. 11, the configurations for inputting the FAX destination in the input box image 129 may differ in variety. For example, the configuration in which addresses in an address book are displayed sequentially by being toggled by tapping on the input box image 129 may be employed. Further, for example, a plurality of choices for the addresses information in the address book may be displayed in a pop-up display or in a different screen display by tapping on the input box image 129. Then, the address information may be selected by tapping on a desired address from among the plurality of choices.

The determination executed in S146 for determining whether or not the set document size is within the range of the document size that is actually FAX transmittable in the selected device may differ in variety regarding its configuration. A determination may be made on whether or not the document size that the read document size information 221 indicates matches one of the document sizes indicated by the FAX transmittable size 204 included in the selected device information 201 that was read in S144. For example, when the FAX transmittable size 204 indicates "A4" and "Letter", an affirmative determination may be made when the document size information 221 indicates "A4", and a negative determination may be made when the document size information 221 indicates "postcard". Further, a determination may be made on whether or not the document size that the read document size information 221 indicates is larger than the maximum document size indicated by the FAX transmittable size 204 included in the selected device information 201 that was read in S144. For example, when the FAX transmittable size 204 indicates "A4" and "Letter", a negative determination may be made when the document size information 221 indicates "A3", and an affirmative determination may be made when the document size information 221 indicates "postcard". Further, the determination of S146 may be made by comparing the document size indicated by the read document size information 221 and the FAX transmittable size 204 included in the selected device information 201 that was read in S144 regarding their values indicating the aforementioned pixel numbers or vertical and horizontal lengths.

In S148, explanation has been given on generating the first FAX image setting information 231 that "reflects" the first default scan image setting information 211. Here, to "reflect" is a concept that include various configurations. That is, it is not limited to the configuration that simply copies the values of the document size information and/or the color information as they are. For example, it may include a configuration that converts the values of the document size information and/or the color information into equivalent values, and adapt the equivalent values. As a specific example, a configuration in which the document size information "A4" is converted to a setting value that expresses the same by vertical and horizontal pixel numbers and then the converted setting value is used may be exemplified. Notably in S152, the same applies to the case of generating the second FAX image setting information 232 that reflects the default FAX image setting information 210.

Further in S148, the first FAX image setting information 231 having the document size information 321 and/or color information 322 that are proximate to the document size information 221 and/or color information 222 may be generated. For example, when the document size information 221 indicates "A4", the first FAX image setting information 231 having the document size information 321 "Letter", which is proximate to "A4", may be generated. Further, in cases where other pieces of information aside from the document size information 221 and color information 222 that can be reflected to the first FAX image setting information 231 are included in the first default scan image setting information 211, those pieces of information may be reflected to the first FAX image setting information 231. Notably, in S152, the same applies to the case of generating the second FAX image setting information 232 that reflects the default FAX image setting information 210.

In S218, the configurations by which the second FAX image data is to be generated may differ in variety. When the content data is data having a format that cannot be subjected to the FAX transmission in the MFP 10, the MFP control program 65 may convert the content data to a data having a format that is FAX transmittable in the MFP 10. This data conversion may be executed by an external server that is not shown. Then, the second FAX image data may be generated by reflecting the third FAX image setting information 233 to the converted data.

The main screen G1 in FIG. 7 has been described using cases where it is a screen that can receive a plurality of operation inputs such as the device selecting operation, the FAX instructing operation, the scan instructing operation, and the like. However, no limitation is made to this embodiment. Other screens (for example, the scan setting screen G3 in FIG. 9) may be given the functionality to receive inputs of various operations (such as the device selecting operation). Further, the functionality to receive inputs of various operations may be given to another independent screen (such as a pop-up screen).

Also, an example in which, in the MFP 10 and the portable terminal 50 of the above described embodiment, various programs stored in the program storage areas 32A and 62A of the memories 32 and 62 are executed by the CPUs 31 and 61, whereby individual processes to be performed by the controller of this disclosure are implemented has been described. However, the configuration of the controller is not limited thereto, and the whole or a part of the controller may be implemented by hardware such as an IC (an abbreviation for Integrated Circuit) and the like.

Further, this disclosure can be implemented as the MFP 10 and the portable terminal 50 and can also be implemented as a program making the MFP 10 and the portable terminal 50 perform the processes. Furthermore, the corresponding program may be recorded in non-transitory recording media to be provided. The non-transitory recording media may include not only CD-ROMs and DVD-ROMs but also a memory mounted on a server which can be connected to the portable terminal 50 via the communication network 101. Further, the program stored in the memory of the server may be distributed as information or a signal representing the corresponding program, via the communication network 101 such as the Internet.

The MFP 10 is an example of an image processing device. The scan setting screen G3 is an example of a first screen. The CPU that executes S125 is an example of "displaying a first screen". The document size selecting operation and the color/monochrome selecting operation are examples of a first inputting operation. The scan starting operation is an example of a second inputting operation. The CPU that executes S140 is an example of "transmitting first scan instruction information". The CPU that executes S142 is an example of "receiving the first scan image data". The CPU that executes S148 is an example of "generating first FAX image setting information". The FAX transmission screen G4 and the FAX transmission screen G5 are examples of a second screen. The CPU that executes S150 and S154 is an example of "displaying a second screen". The button image B42 is an example of a first setting image. The destination inputting operation is an example of a third inputting operation. The FAX starting operation is an example of a fourth inputting operation. The CPU that executes S163 is an example of "generating first FAX image data". The CPU that executes S165 is an example of "transmitting first FAX instruction information and the first FAX image data". The CPU that executes S123 is an example of "reading the scan image setting information". The setting value images G31, G32 are examples of a second setting image. The scan setting screen G3 is an example of a first screen. The CPU that executes S146 is an example of "determining whether or not an image size of the scan image data indicates an image size that can be transmitted in the FAX transmission process". The CPU that executes S152 is an example of "generating second FAX image setting information". The CPU that executes S144 is an example of "reading default FAX image setting information". The main screen G1 is an example of a third screen. The CPU that executes S90 is an example of "displaying a third screen". The device selecting operation is an example of a fifth inputting operation. The CPU that executes S100 is an example of "receiving scan functionality information and FAX functionality information". The CPU that executes S167 is an example of "determining whether or not a value of the first FAX image setting information matches a value of the default FAX image setting information". The CPU that executes S169 is an example of "storing the first FAX image setting information". The source selection screen G2 is an example of a fourth screen. The CPU that executes S115 is an example of "displaying a fourth screen". The internal image transmitting operation is an example of a sixth inputting operation. The CPU that executes S212 is an example of "generating third FAX image setting information". The CPU that executes S218 is an example of "generating second FAX image data". The CPU that executes S221 is an example of "transmitting second FAX instruction information and the second FAX image data". The CPU that executes S135 is an example of "storing the scan image setting information". The main screen G1 is an example of a fifth screen. The scan instructing operation is an example of a seventh inputting operation. The CPU that executes S323 is an example of "reading the scan image setting information". The CPU that executes S325 is an example of "displaying a sixth screen". The button images B31a, B32a are examples of a fourth setting image. The CPU that executes S340 is an example of "transmitting third scan instruction information". The CPU that executes S345 is an example of "receiving the second scan image data". The CPU that executes S350 is an example of "storing the received second scan image data". The CPU that executes S103 is an example of "storing the scan image setting information in the first default scan image setting area". The CPU that executes S103 is an example of "storing the scan image setting information in the second default scan image setting area". The FAX instructing operation is an example of a ninth inputting operation. The FAX transmission screen G5 is an example of a second screen of a first embodiment. The FAX transmission screen G4 is an example of a second screen of a second embodiment. The pop-up image W11 is an example of a first specific image.

What is claimed is:

1. A non-transitory computer-readable recording medium storing computer-readable instructions for a portable terminal, wherein the portable terminal comprises a display and a network interface, and the display comprises a touch panel,
   the computer-readable instructions, when executed by a processor of the portable terminal, causing the portable terminal to perform:
   receiving, via the touch panel, a selecting inputting operation of selecting one image processing device that is to execute a scan process and a FAX transmission process from among a plurality of image processing devices;

receiving start instruction operation for instructing to start a scan-to-fax process via the touch panel,
    the scan-to-fax process being a process of transmitting an image indicated by scan data, which was generated by executing the scan process in the selected image processing device, from the selected image processing device to a transmission destination by the FAX transmission process;

reading, from a memory of the portable terminal, a first scan image setting information that is setting information on various setting items for scan image data to be generated in the scan process,
    the first scan image setting information being stored, when the scan-to-fax process was performed previously, in a first default scan image setting area of the memory;

reading default FAX image setting information from the memory of the portable terminal,
    the default FAX image setting information being stored, when the FAX transmission process was performed previously, in a default FAX image setting area of the memory, and
    each of the first scan image setting information and the default FAX image setting information includes a common setting item;

transmitting first scan instruction information to the selected image processing device via the network interface in response to receiving the start instruction operation,
    the first scan instruction information being information for instructing the selected image processing device to generate first scan image data by the scan process based on the first scan image setting information, which was read by the reading;

generating first FAX image setting information based on the read default FAX image setting information;

receiving an address inputting operation to designate address information indicating the transmission destination for the FAX transmission process via the touch panel;

and transmitting first FAX instruction information to the selected image processing device via the network interface,
    the first FAX instruction information being information for instructing the selected image processing device to execute the FAX transmission process in order to transmit the first scan image data to the transmission destination indicated by the address information.

2. The non-transitory computer-readable recording medium of claim 1, wherein
the default FAX image setting information includes the common setting item that is included in the first scan image setting information and a non-common setting item that is not included in the first scan image setting information,
the generating includes generating first FAX image setting information based on the common setting item included in the first scan image setting information and the non-common setting item included in the default FAX image setting information.

3. The non-transitory computer-readable recording medium of claim 1, wherein
the computer-readable instructions, when executed by the processor of the portable terminal, cause the portable terminal to further perform:

receiving a common setting item changing operation of designating first scan image setting information;
changing the contents of the common setting item included in the first scan image setting information read by the reading of the first scan image setting information in response to the receipt of the common setting item changing operation; and
determining whether or not a specific common setting item of the scan image data indicates a specific common setting item that can be transmitted in the FAX transmission process by the image processing device when the first scan image setting information is changed in the changing,
    the image size of the scan image data being included in the first scan image setting information,
wherein
the generating of the first FAX image setting information is executed such that the image size of the scan image included in the first FAX image setting information is identical to the image size of the scan image included in the first scan image setting information, in response to a determination in the determining that an image size of the scan image data included in the first scan image setting information is indicating an image size that can be transmitted in the FAX transmission process,
the generating of the first FAX image setting information includes generating the first FAX image setting information that reflects the default FAX image setting information that was read in the reading, in response to the determination that an image size of the scan image data included in the first scan image setting information is indicating an image size that cannot be transmitted in the FAX transmission process.

4. The non-transitory computer-readable recording medium of claim 3, wherein
the common setting item defines sizes of images indicated by the scan image data.

5. The non-transitory computer-readable recording medium of claim 3, wherein
the common setting item indicates whether the scan image data is color images or monochrome images.

6. The non-transitory computer-readable recording medium of claim 3, wherein
the computer-readable instructions, when executed by the processor of the portable terminal, cause the portable terminal to further perform:
receiving a selection between the scan-to-fax process and an internal-image-fax process via the touch panel on the display,
    the internal-image-fax process being a process of transmitting an image, indicated by stored data in the memory, from the selected image processing device to the transmission destination by the FAX transmission process,
the reading of the default FAX image setting information includes reading the default FAX image setting information in response to receiving the selection between the scan-to-fax process and the internal-image-fax process,
when the internal-image-fax process is selected, the computer-readable instructions, when executed by the processor of the portable terminal, cause the portable terminal to further perform:
generating second FAX image setting information, based on the read default FAX image setting information, receiving a modification to the content of the second FAX image setting information via the touch panel, generating second FAX image data that is generated from the stored image data using the second FAX image setting information; and transmitting second FAX instruction information and second FAX image data to the selected image processing device via the network interface, the second FAX instruction information being information for instructing the selected image processing device to execute the FAX transmission process and transmit the second FAX image data, when the scan-to-fax process is selected, the computer-readable instructions, when executed by the processor of the portable terminal, cause the portable terminal to further perform:

receiving, via the touch panel, a modification to the content of the first FAX image setting information that reflects the default FAX image setting information that was read in the reading or a modification to the content of the first FAX image setting information that includes the image size of the scan image that is identical to the image size of the scan image included in the first scan image setting information.

7. The non-transitory computer-readable recording medium of claim 6, wherein the computer-readable instructions, when executed by the processor of the portable terminal, cause the portable terminal to further perform receiving a selection between a scan instruction and a fax instruction via the touch panel on the display, the scan instruction being for causing the scan image data, which was generated by executing the scan process in the selected image processing device, to be stored in the memory of the portable terminal, and the fax instruction being for instructing at least one of the scan-to-fax process and the internal-image-fax process, when the fax instruction is selected, the receiving of the selection between the scan-to-fax process and the internal-image-fax process is performed, when the scan instruction is received, the computer-readable instructions, when executed by the processor of the portable terminal, cause the portable terminal to further perform:

reading, from the memory, a second scan image setting information that is setting information on various setting items for scan image data to be generated based on the scan instruction, the second scan image setting information being different from the first scan image setting information and being stored, when a FAX transmission process was performed previously, in a second default scan image setting area of the memory;

receiving a modification to the content of the second scan image setting information via the touch panel; and transmitting second scan instruction information to the selected image processing device via the network interface when the modification to the content of the second scan image setting information is received, the second scan instruction information being information for instructing the selected image processing device to generate second scan image data by the scan process based on the modified second scan image setting information.

8. The non-transitory computer-readable recording medium of claim 7, wherein the first default scan image setting area and the second default scan image setting area are in a same area of the memory.

9. A portable terminal comprising:

a display including a touch panel;

a network interface;

a processor; and a memory storing instructions that, when executed by the processor, cause the processor to perform:

receiving, via the touch panel, a selecting inputting operation of selecting one image processing device that is to execute a scan process and a FAX transmission process from among a plurality of image processing devices;

receiving a start instruction operation for instructing to start a scan-to-fax process via the touch panel, the scan-to-fax process being a process of transmitting an image indicated by scan data, which was generated by executing the scan process in the selected image processing device, from the selected image processing device to a transmission destination by the FAX transmission process;

reading, from a memory of the portable terminal, a first scan image setting information that is setting information on various setting items for scan image data to be generated in the scan process, the first scan image setting information being stored, when the scan-to-fax process was performed previously, in a first default scan image setting area of the memory, reading default FAX image setting information from the memory of the portable terminal, the default FAX image setting information being stored, when the FAX transmission process was performed previously, in a default FAX image setting area of the memory, and each of the first scan image setting information and the default FAX image setting information includes a common setting item;

transmitting first scan instruction information to the selected image processing device via the network interface in response to receiving the start instruction operation, the first scan instruction information being information for instructing the selected image processing device to generate first scan image data by the scan process based on the first scan image setting information, which was read by the reading;

generating first FAX image setting information based on the read default FAX image setting information;

receiving an address inputting operation to designate address information indicating the transmission destination for the FAX transmission process via the touch panel;

and transmitting first FAX instruction information to the selected image processing device via the network interface, the first FAX instruction information being information for instructing the selected image processing device to execute the FAX transmission process in order to transmit the first scan image data to the transmission destination indicated by the address information.

10. A communication system comprising a portable terminal and a plurality of image processing devices, wherein the portable terminal includes: a display including a touch panel; a first network interface; a processor; and a memory storing first instructions, the first instructions, when executed by the processor, cause the portable terminal to perform:

receiving, via the touch panel, a selecting inputting operation of selecting one image processing device that is to execute a scan process and a FAX transmission process from among a plurality of image processing devices;

receiving start instruction operation for instructing to start a scan-to-fax process via the touch panel, the scan-to-fax process being a process of transmitting an image indicated by scan data, which was generated by executing the scan process in the selected image processing device, from the selected image processing device to a transmission destination by the FAX transmission process;

reading, from the memory of the portable terminal, a first scan image setting information that is setting information on various setting items for scan image data to be generated in the scan process, the first scan image setting information being stored, when the scan-to-fax process was performed previously, in a first default scan image setting area of the memory, reading default FAX image setting information from the memory of the portable terminal, the default FAX image setting information being stored, when the FAX transmission process was performed previously, in a default FAX image setting area of the memory, and each of the first scan image setting information and the default FAX image setting information includes a common setting item; and transmitting first scan instruction information to the selected image processing device via the first network interface in response to receiving the start instruction operation, the first scan instruction information being information for instructing the selected image processing device to generate first scan image data by the scan process based on the first scan image setting information, which was read by the reading;

the selected image processing device includes a second network interface, a processor; and a memory storing second instructions, the second instructions, when executed by the processor, cause the selected image processing device to perform:

receiving the first scan instruction information via the second network interface; and executing the scan process using the first scan image setting information to generate the first scan image data;

the first instructions in the memory of the portable terminal cause the portable terminal to further perform:

generating first FAX image setting information based on the read default FAX image setting information receiving an address inputting operation to designate address information indicating the transmission destination for the FAX transmission process via the touch panel;

and transmitting first FAX instruction information to the selected image processing device via the first network interface, the first FAX instruction information being information for instructing the selected image processing device to execute the FAX transmission process in order to transmit the first scan image data to the transmission destination indicated by the address information, the second instructions in the memory of the selected image processing device cause the selected image processing device to further perform:

receiving the first FAX instruction information via the second network interface; and transmitting the first scan image data to the transmission destination indicated by the address information via the second network interface.

* * * * *